US008068457B2

(12) United States Patent
Pi et al.

(10) Patent No.: US 8,068,457 B2
(45) Date of Patent: Nov. 29, 2011

(54) METHODS FOR TRANSMITTING MULTIPLE ACKNOWLEDGMENTS IN SINGLE CARRIER FDMA SYSTEMS

(75) Inventors: Zhouyue Pi, Richardson, TX (US); Farooq Khan, Allen, TX (US); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 914 days.

(21) Appl. No.: 12/041,568

(22) Filed: Mar. 3, 2008

(65) Prior Publication Data

US 2008/0225791 A1 Sep. 18, 2008

Related U.S. Application Data

(60) Provisional application No. 60/919,434, filed on Mar. 22, 2007, provisional application No. 60/906,790, filed on Mar. 13, 2007.

(51) Int. Cl.
*H04W 4/00* (2009.01)
*H04B 7/204* (2006.01)

(52) U.S. Cl. ........................................ 370/329; 370/235

(58) Field of Classification Search .................. 370/235, 370/329

See application file for complete search history.

(56) References Cited

U.S. PATENT DOCUMENTS

| | | | | |
|---|---|---|---|---|
| 5,493,569 | A * | 2/1996 | Buchholz et al. | 370/442 |
| 5,691,979 | A * | 11/1997 | Cadd et al. | 370/312 |
| 7,305,486 | B2 * | 12/2007 | Ghose et al. | 709/232 |
| 2006/0007889 | A1 * | 1/2006 | Khan | 370/331 |
| 2006/0195767 | A1 | 8/2006 | Ihm et al. | |
| 2006/0280256 | A1 | 12/2006 | Kwon et al. | |
| 2007/0234385 | A1 * | 10/2007 | Bopardikar et al. | 725/38 |
| 2008/0205348 | A1 * | 8/2008 | Malladi | 370/335 |
| 2010/0017675 | A1 * | 1/2010 | Ihm et al. | 714/751 |

FOREIGN PATENT DOCUMENTS

| | | |
|---|---|---|
| KR | 100606099 B1 | 7/2006 |
| WO | WO 2005/117385 | 12/2005 |

OTHER PUBLICATIONS

Search Report from the International Patent Office issued in Applicant's corresponding International Patent Application No. PCT/KR2008/001423 dated Jun. 24, 2008.

* cited by examiner

*Primary Examiner* — Ronald Abelson

(57) ABSTRACT

A mapping scheme between a plurality of control channel element sets and a plurality of acknowledgement channel resource sets is established. Each of the control channel element sets includes at least one control channel element, and each of the acknowledgement channel resource sets includes at least one acknowledgement channel resource. In accordance with a scheduling grant transmitted using a control channel element set selected from the plurality of control channel element sets, a data packet is transmitted via a second node to a first node. Then, an acknowledgement channel message is transmitted via the first node to the second node by using at least one acknowledgement channel resource selected from the acknowledgement channel resource set that correspond to the control channel element set used for transmitting the scheduling grant in accordance with the mapping scheme. The acknowledgement channel message may be one of a positive acknowledgement message and a negative acknowledgement message.

34 Claims, 21 Drawing Sheets

Orthogonal Frequency Division Multiplexing

METHODS FOR TRANSMITTING MULTIPLE ACKNOWLEDGMENTS IN SINGLE CARRIER FDMA SYSTEMS

CLAIM OF PRIORITY

This application makes reference to, incorporates the same herein, and claims all benefits accruing under 35 U.S.C. §119 from a provisional application earlier filed in the U.S. Patent & Trademark Office on 13 Mar. 2007 and there duly assigned Ser. No. 60/906,790. This application also makes reference to, incorporates the same herein, and claims all benefits accruing under 35 U.S.C. §119 from a provisional application earlier filed in the U.S. Patent & Trademark Office on 22 Mar. 2007 and there duly assigned Ser. No. 60/919,434.

BACKGROUND OF THE INVENTION

1. Field of the Invention

The present invention relates to a method and an apparatus for transmitting acknowledgement channel messages in communication systems.

2. Description of the Related Art

Telecommunication enables transmission of data over a distance for the purpose of communication between a transmitter and a receiver. For wireless communication, the data is usually carried by radio waves and is transmitted using a limited transmission resource. That is, radio waves are transmitted over a period of time using a limited frequency range.

In a contemporary communication system, the information to be transmitted are first encoded and then modulated to generate multiple modulation symbols. The symbols are subsequently mapped into transmission resource. Usually, the transmission resource available for data transmission is segmented into a plurality of equal duration time and frequency slots, so called resource elements. A single resource element or multiple resource elements may be allocated for transmitting the data. When data is transmitted, a control signal may accompany the data to carry information regarding the allocation of the resource elements for the current data transmission. Therefore, when a receiver receives the data and the control signal, the receiver may derive the information regarding resource allocation used for data transmission from the control signal and decodes the received data using the derived information.

During an uplink transmission in the Third ($3^{rd}$) Generation Partnership Project Long Term Evolution (3GPP LTE) systems, a unit of user equipment (UE) transmits a data packet to a base station (BS) after receiving an uplink scheduling grant (i.e., uplink grant) from the BS. In response to the received data packet from the UE, the BS transmits a downlink acknowledgement channel message (i.e., downlink ACK) to the UE. During a downlink transmission, a BS transmits a data packet to a UE together with or after transmitting a downlink scheduling grant (i.e., downlink grant) to the UE. In response to the received data packet from the BS, the UE transmits an uplink acknowledgement channel message (i.e., uplink ACK) to the UE. An acknowledgement channel message can be either a positive acknowledgement message (ACK) or a negative acknowledgement message (NAK).

Contemporarily, information regarding the allocation of ACK channel resources is transmitted via either explicit signaling or linking to data channel resources. Explicit signaling of ACK channel resource may result in large overhead. Linking ACK channel resources to data channel resources may result in large amount of ACK channel resource requirement, regardless of the actual system load.

SUMMARY OF THE INVENTION

It is therefore an object of the present invention to provide an improved method and apparatus for communication.

It is another object of the present invention to provide a method and apparatus for efficiently transmitting acknowledgement channel messages.

According to one aspect of the present invention, a method for communication is provided. In this method, a mapping scheme between a plurality of control channel element sets and a plurality of acknowledgement channel resource sets is established. Each of the control channel element sets includes at least one control channel element, and each of the acknowledgement channel resource sets includes at least one acknowledgement channel resource. In response to a scheduling grant transmitted using a control channel element set selected from the plurality of control channel element sets, a data packet is transmitted via a second node to a first node. Then, an acknowledgement channel message is transmitted via the first node to the second node by using at least one acknowledgement channel resource selected from the acknowledgement channel resource set that correspond to the control channel element set used for transmitting the scheduling grant in accordance with the mapping scheme. The acknowledgement channel message may be one of a positive acknowledgement message and a negative acknowledgement message.

The mapping scheme may include at least one mapping relationship selected from a group of mapping relationships including: an acknowledgement channel resource set including one acknowledgement channel resource corresponding to a control channel element set including one control channel element; an acknowledgement channel resource set including one acknowledgement channel resource corresponding to a control channel element set including more than one control channel element; an acknowledgement channel resource set including more than one acknowledgement channel resource corresponding to a control channel element set including one control channel element; and an acknowledgement channel resource set including more than one acknowledgement channel resource corresponding to a control channel element set including more than one control channel element.

The plurality of acknowledgement channel resource sets may be constructed from one of one or a set of Zadoff-Chu sequences with different indices, one or a set of Zadoff-Chu sequences with different offsets, and one or a set of Zadoff-Chu sequences with different hopping patterns, with the Zadoff-Chu sequence being established by:

$$g_p(n) = \begin{cases} e^{-j\frac{2\pi}{M}\frac{1}{2}pn^2} & \text{when } N \text{ is even} \\ e^{-j\frac{2\pi}{M}\frac{1}{2}pn(n+1)} & \text{when } N \text{ is odd} \end{cases}, n = 0, 1, \ldots, N-1,$$

where N is the length of the Zadoff-Chu sequence, p is the index of the Zadoff-Chu sequence and p is relatively prime to N, and n is the sample index of the Zadoff-Chu sequence.

The acknowledgement channel resources may be distinguished from each other either in time domain or in frequency domain.

The mapping scheme may change along at least one dimension selected from time, frequency, sector, and code and sequence set. The mapping scheme may change at different scale along each dimension.

More than one acknowledgement channel messages may be simultaneously transmitted by using more than one acknowledgement channel resource sets. The more than one acknowledgement channel resource sets may have different numbers of acknowledgement channel resources.

At least two of the control channel element sets may overlap each other. In addition, at least two of the acknowledgement channel resource sets may overlap each other.

According to another aspect of the present invention, a method for communication is provided. In this method, a plurality of data packets are transmitted from a first node to a second node. In response to the data packets received, the second node transmits a plurality of acknowledgement channel messages corresponding to the data packets to the first node using a phase shift keying (PSK) modulation scheme combined with an Off state in an On-Off keying modulation scheme. Each of the plurality of acknowledgement channel messages may be one of a positive acknowledgement message and a negative acknowledgement message.

When at least one negative acknowledgement message is transmitted from the second node to the first node, the first node may retransmits the data packets corresponding to the at least one negative acknowledgement message to the second node. Then the second node may transmit acknowledgement channel messages corresponding to the retransmitted data packets using a different phase shift keying (PSK) modulation scheme with a different keying scheme and a different constellation than the phase shift keying (PSK) modulation scheme used in the transmission of the previous acknowledgement channel messages.

When two data packets are transmitted from the first node to the second node, the second node transmits two acknowledgement channel messages using an order-3 phase shift keying (3-PSK) modulation scheme with the Off state. The two acknowledgement channel messages may be transmitted by using the Off state with an absence of carrier wave when both of the two acknowledgement channel messages are negative acknowledgement messages. When one of the two acknowledgement channel messages is a positive acknowledgement message, and the other one is a negative acknowledgement message, a data packet may be retransmitted from the first node to the second node. In this case, the second node may transmit an acknowledgement channel message to the first node using the On-Off keying modulation scheme.

According to yet another aspect of the present invention, a method for communication is provided. In this method, a plurality of data packets are transmitted from a first node to a second node. In response to the data packets received, the second node transmits an acknowledgement channel message to the first node. The acknowledgement channel message may be a negative acknowledgement message when at least one data packet is not successfully received by the second node; and the acknowledgement channel message may be a positive acknowledgement message when all of the data packets are successfully received by the second node. In response to a negative acknowledgement message received, the first node retransmits the plurality of data packets to the second node.

According to still another aspect of the present invention, a method for communication is provided. In this method, at least one data packet is transmitted from a first node to a second node. In response to the at least one data packet received, the second node transmits a plurality of acknowledgement channel messages to the first node using a plurality of acknowledgement channel resources. Each of the plurality of the acknowledgement channel messages being one of a positive acknowledgement message (ACK) and a negative acknowledgement message (NAK).

The plurality of acknowledgement channel resources may be constructed from one of a set of Zadoff-Chu sequences with different indices, a set of Zadoff-Chu sequences with different offsets, and a set of Zadoff-Chu sequences with different hopping patterns.

According to still yet another aspect of the present invention, a method for communication is provided. In this method, two resource blocks at opposite edges of a band of transmission resource are assigned to acknowledgement channel transmission in a Frequency Division Multiple Access (FDMA) system, e.g., a single-carrier FDMA (SC-FDMA) system. Each resource block includes a certain number of continuous frequency subcarriers. A plurality of acknowledgement channel messages are mapped into each one of the two resource blocks at each one of two time slots in a time-domain subframe. Each time slot includes a certain number of continuous time blocks. For example, in a SC-FDMA system, one SC-FDMA block can be viewed as a time block. Alternatively, a time block may contain a plurality of SC-FDMA blocks. Then, the time blocks in the two time slots mapped with the acknowledgement channel messages are multiplexed. Finally, the plurality of acknowledgement channel messages is transmitted by using the corresponding time slots and resource blocks.

In each one of the two time slots, the time blocks assigned to at least one of the acknowledgement channel messages may be continuous.

Alternatively, in each one of the two time slots, the time blocks assigned to at least one of the acknowledgement channel messages may be not continuous.

Each of the acknowledgement channel messages may be modulated by using a keying scheme selected from a group of On-off keying, Binary Phase Shift Keying, and orthogonal signaling. Here, each of the plurality of acknowledgement channel messages may be one of a positive acknowledgement message and a negative acknowledgement message.

According to a further aspect of the present invention, a method for communication is provided. In this method, a plurality of acknowledgement channel messages are mapped to a plurality of input ports of a discrete Fourier transform unit, with each acknowledgement message corresponding to at least one input port. Then the discrete Fourier transform unit transforms the plurality of acknowledgement channel messages to generate a single signal. The single signal is then processed in a single carrier frequency division multiple access system. Finally the processed signals are transmitted via an antenna.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
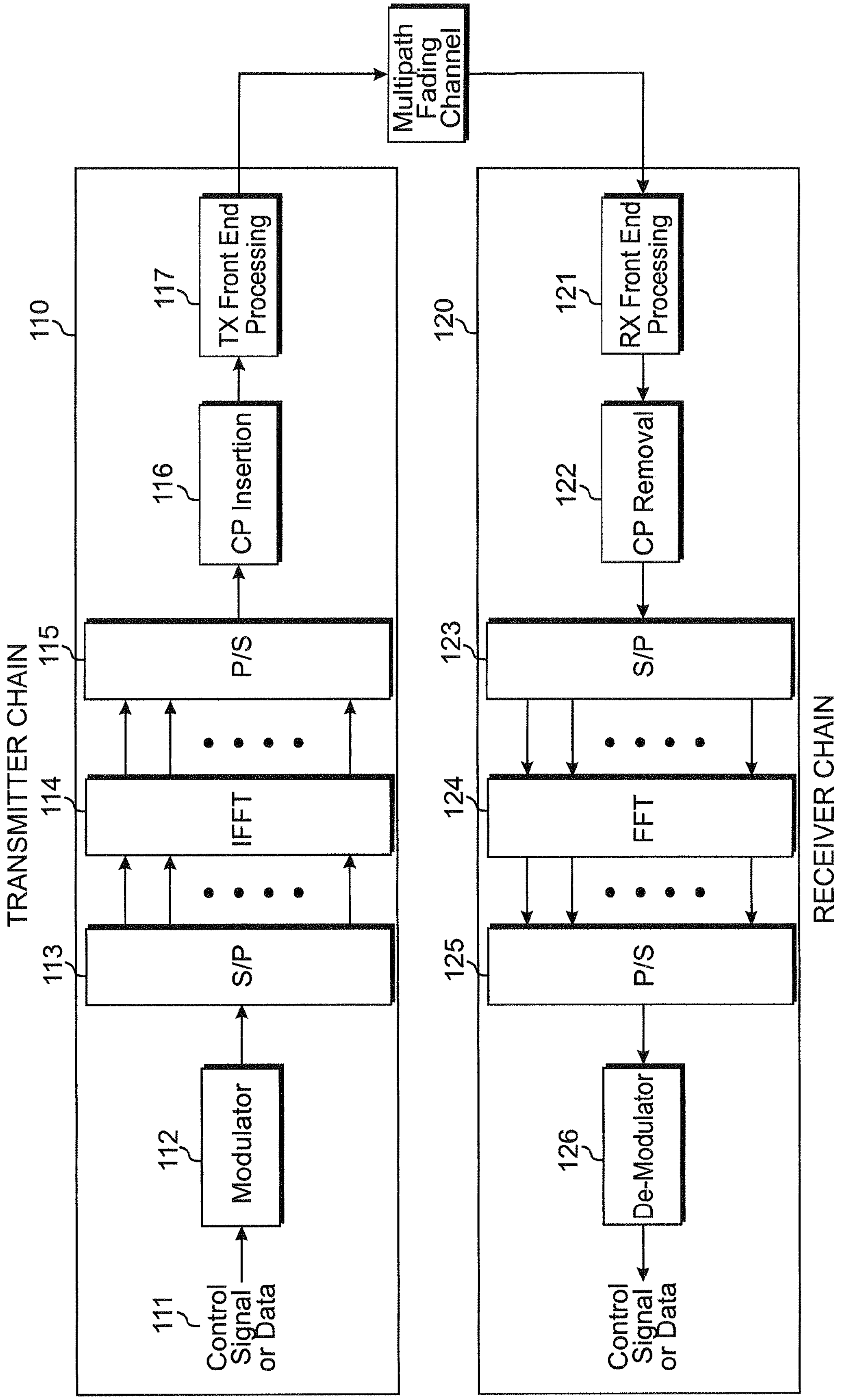
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 into a series of modulation symbols, that are subsequently serial-to-parallel converted by Serial/Parallel (S/P) converter 113. Inverse Fast Fourier Transform (IFFT) unit 114 is used to transfer the signals from frequency domain to time domain into a plurality of OFDM symbols. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

Figure 2:
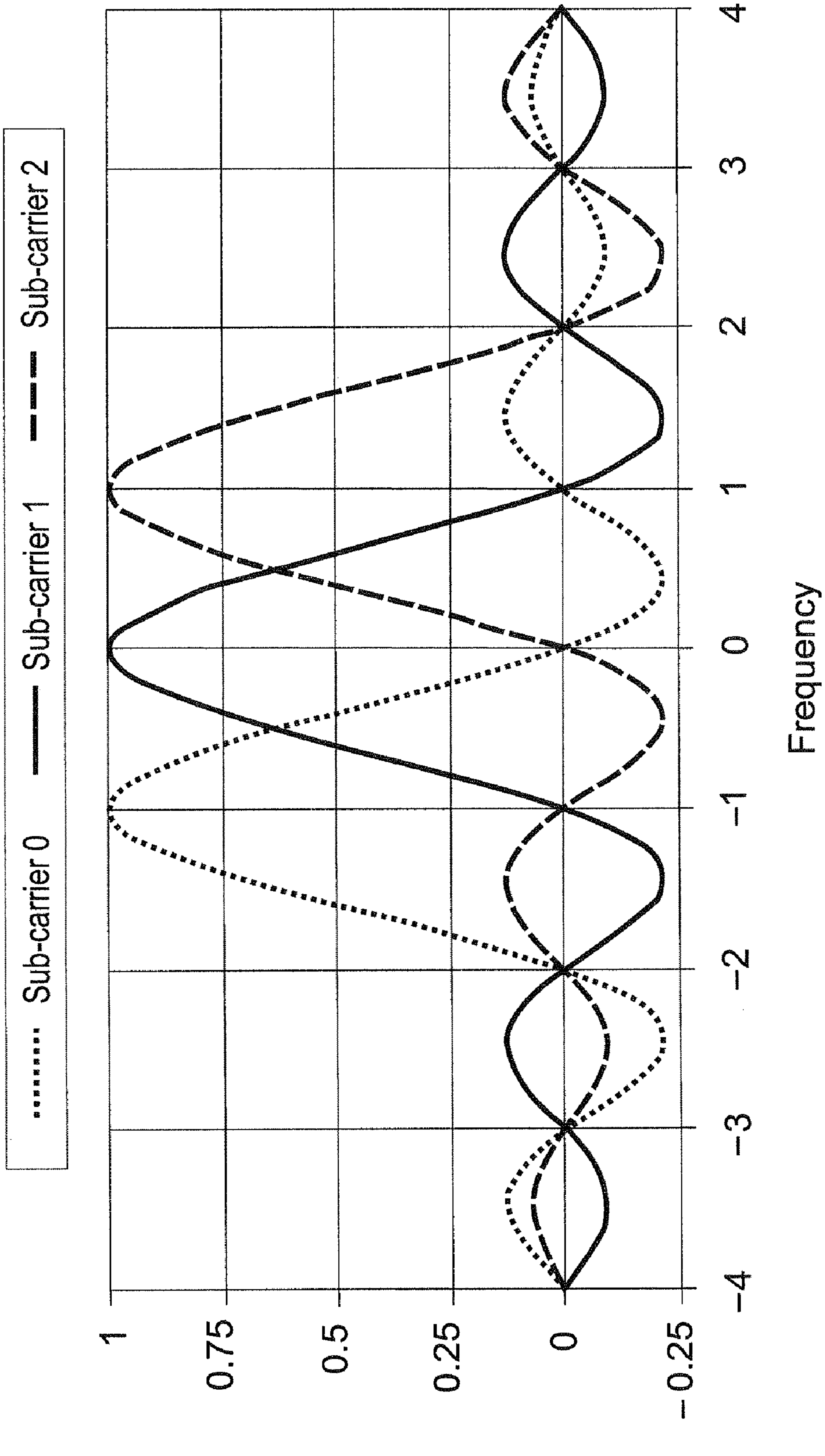
FIG. 2 is two coordinate graphs of OFDM subcarriers showing amplitude as a function of frequency.

In a OFDM system, each OFDM symbol consists of multiple sub-carriers. Each sub-carrier within an OFDM symbol carriers a modulation symbol. FIG. 2 illustrates the OFDM transmission scheme using sub-carrier 1, sub-carrier 2, and sub-carrier 3. Because each OFDM symbol has finite duration in time domain, the sub-carriers overlap with each other in frequency domain. The orthogonality is maintained at the sampling frequency assuming the transmitter and the receiver has perfect frequency synchronization, as shown in FIG. 2. In the case of frequency offset due to imperfect frequency synchronization or high mobility, the orthogonality of the sub-carriers at sampling frequencies is destroyed, resulting in inter-carrier-interference (ICI).

Figure 3:
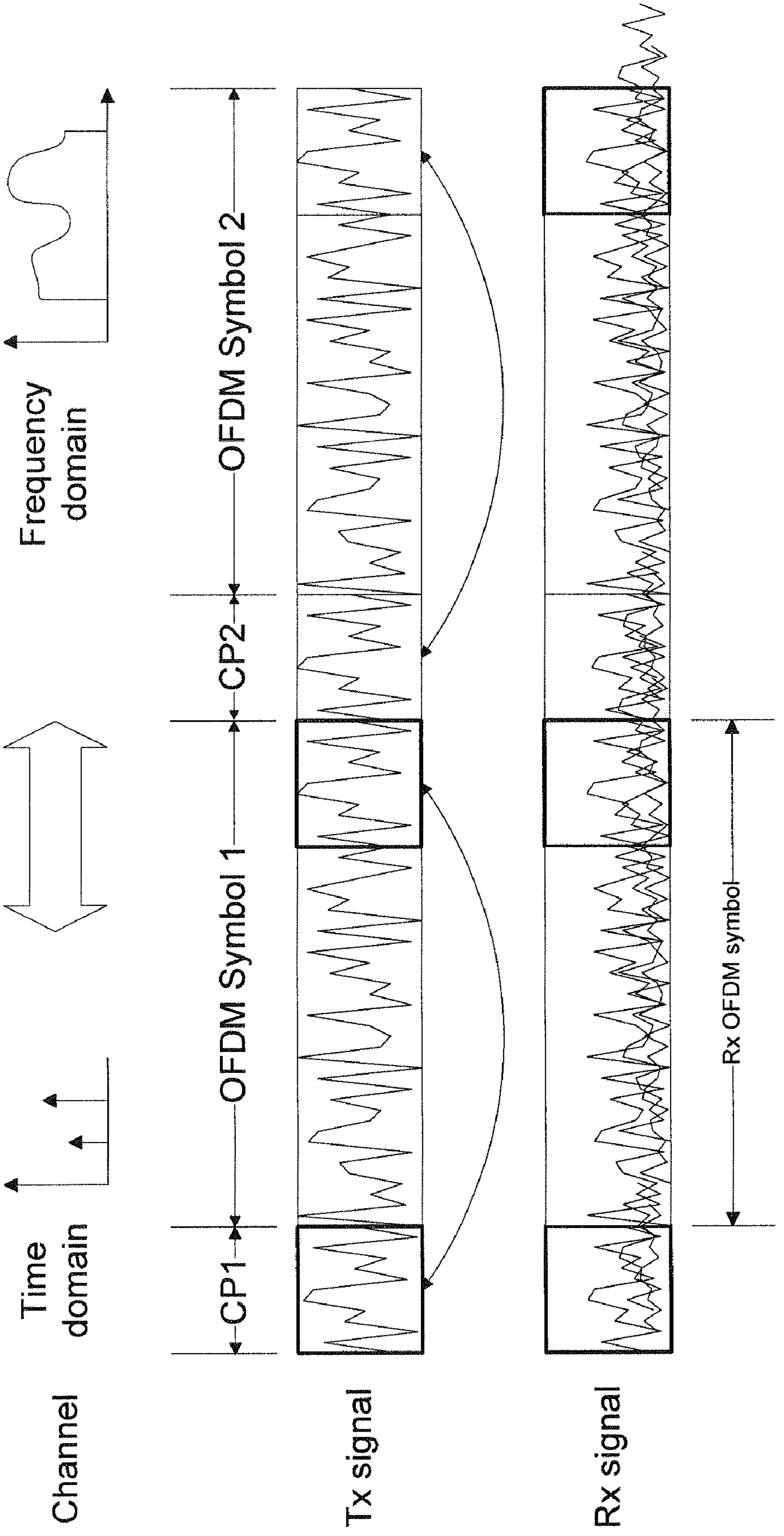
FIG. 3 is an illustration of the transmitted and received waveforms for OFDM symbols in a time domain.

A time domain illustration of the transmitted and received OFDM symbols is shown in FIG. 3. Due to multipath fading, the CP portion of the received signal is often corrupted by the previous OFDM symbol. As long as the CP is sufficiently long, however, the received OFDM symbol without CP should only contain its own signal convoluted by the multipath fading channel. In general, a Fast Fourier Transform (FFT) is taken at the receiver side to allow further processing frequency domain. The advantage of OFDM over other transmission schemes is its robustness to multipath fading. The multipath fading in time domain translates into frequency selective fading in frequency domain. With the cyclic prefix or zero prefix added, the inter-symbol-interference between adjacent OFDM symbols are avoided or largely alleviated. Moreover, because each modulation symbol is carried over a narrow bandwidth, it experiences a single path fading. Simple equalization scheme can be used to combat frequency selection fading.

Figure 4:
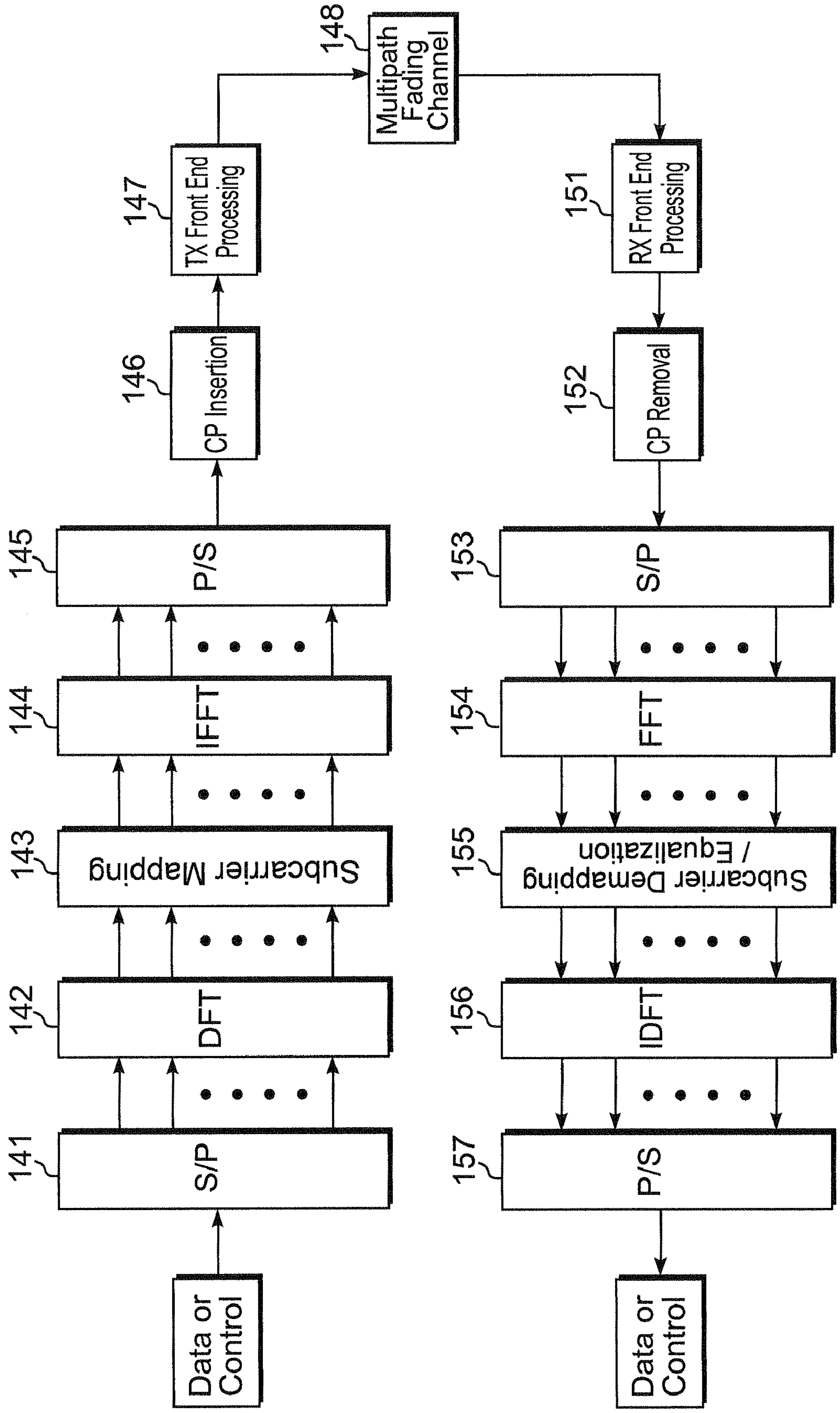
FIG. 4 is an illustration of single carrier frequency division multiple access transceiver chain.

Single carrier frequency division multiple access (SC-FDMA), which utilizes single carrier modulation and frequency domain equalization is a technique that has similar performance and complexity as those of an OFDMA system. One advantage of SC-FDMA is that the SC-FDMA signal has lower peak-to-average power ratio (PAPR) because of its inherent single carrier structure. Low PAPR normally results in high efficiency of power amplifier, which is particularly important for mobile stations in uplink transmission. SC-FDMA is selected as the uplink multiple access scheme in the Third Generation Partnership Project (3GPP) long term evolution (LTE). An example of the transceiver chain for SC-FDMA is shown in FIG. 4. At the transmitter side, the data or control signal is serial to parallel (S/P) converted by a S/P convertor 181. Discrete Fourier transform (DFT) will be applied to time-domain data or control signal by a DFT transformer 182 before the time-domain data is mapped to a set of sub-carriers by a sub-carrier mapping unit 183. To ensure low PAPR, normally the DFT output in the frequency domain will be mapped to a set of contiguous sub-carriers. Then IFFT, normally with larger size than the DFT, will be applied by an IFFT transformer 184 to transform the signal back to time domain. After parallel to serial (P/S) convertion by a P/S/ converter 185, cyclic prefix (CP) will be added by a CP insertion unit 186 to the data or the control signal before the data or the control signal is transmitted to a transmission front end processing unit 187. The processed signal with a cyclic prefix added is often referred to as a SC-FDMA block. After the signal passes through a communication channel 188, e.g., a multipath fading channel in a wireless communication system, the receiver will perform receiver front end processing by a receiver front end processing unit 191, remove the CP by a CP removal unit 192, apply FFT by a FFT transformer 194 and frequency domain equalization. Inverse Discrete Fourier transform (IDFT) 196 will be applied after the equalized signal is demapped 195 in frequency domain. The output of IDFT will be passed for further time-domain processing such as demodulation and decoding.

In packet-based wireless data communication systems, control signals transmitted through control channels, i.e., control channel transmission, generally accompany data signals transmitted through data channels, i.e., data transmission. Control channel information, including control channel format indicator (CCFI), acknowledgement signal (ACK), packet data control channel (PDCCH) signal, carries transmission format information for the data signal, such as user ID, resource assignment information, Payload size, modulation, Hybrid Automatic Repeat-reQuest (HARQ) information, MIMO related information.

Hybrid Automatic Repeat reQuestion (HARQ) is widely used in communication systems to combat decoding failure and improve reliability. Each data packet is coded using certain forward error correction (FEC) scheme. Each subpacket may only contains a portion of the coded bits. If the transmission for subpacket k fails, as indicated by a NAK in a feedback acknowledgement channel, a retransmission subpacket, subpacket k+1, is transmitted to help the receiver decode the packet. The retransmission subpackets may contain different coded bits than the previous subpackets. The receiver may softly combine or jointly decode all the received subpackets to improve the chance of decoding. Normally, a maximum number of transmissions is configured in consideration of both reliability, packet delay, and implementation complexity.

Figure 5:
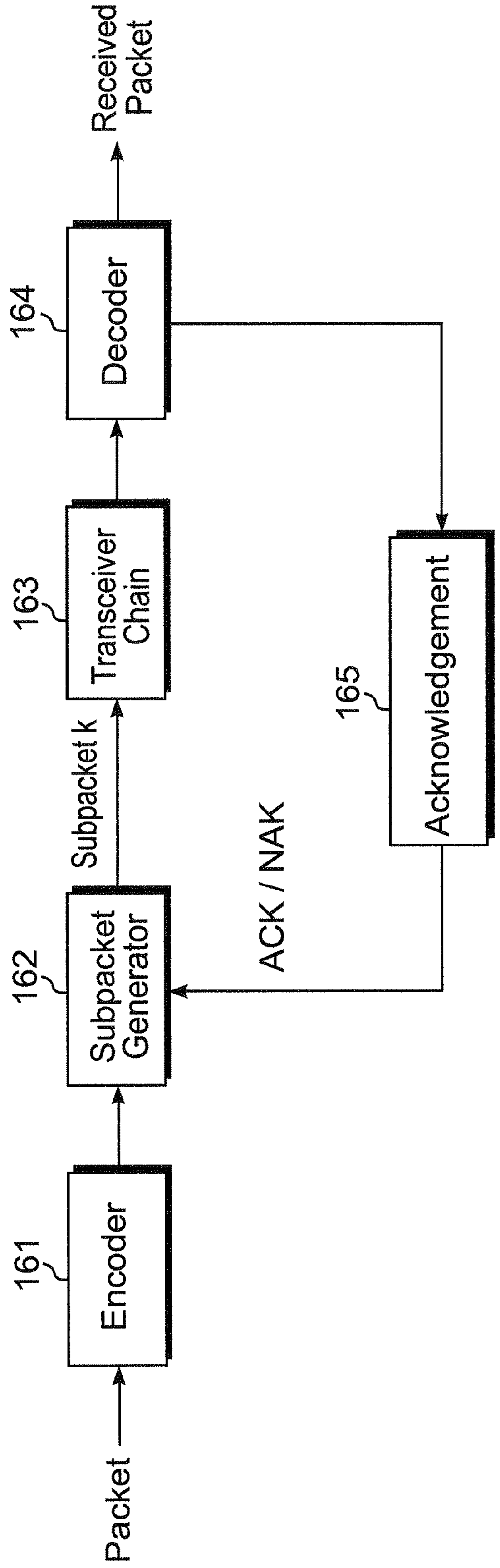
FIG. 5 schematically illustrates a Hybrid Automatic Repeat request (HARQ) transceiver chain.

Due to its simplicity, N-channel synchronous HARQ are often used in wireless communication systems. For example, synchronous HARQ has been accepted as the HARQ scheme for LTE uplink in 3GPP. FIG. 5 shows an example of a 4-channel synchronous HARQ. Due to fixed timing relationship between subsequent transmissions, the transmission slots in the same HARQ channel exhibits an interlace structure. For example, interlace 0 consists of slot 0, 4, 8, . . . , 4*k*, . . . ; interlace 1 consists of slot 1, 5, 9, . . . , 4*k*+1, . . . ; interlace 2 consists of slot 2, 6, 10, . . . , 4*k*+2, . . . ; interlace 3 consists of slot 3, 7, 11, . . . 4*k*+3 . . . . Let's take interlace 0 as an, example. A sub-packet is transmitted in slot 0. After correctly decoding the packet, the receiver sends back an ACK to the transmitter. The transmitter then can start a new packet at the next slot in this interlace, i.e., slot 4. However, the first subpacket transmitted in slot 4 is not correctly received. After the transmitter receives the NAK from the receiver, the transmitter transmits another sub-packet of the same packet at the next slot in this interlace, i.e., slot 8. Sometimes a receiver might have difficulty in detecting the packet boundary, i.e., whether a subpacket is the first subpacket of a new packet or a retransmission sub-packet. To alleviate this problem, a new packet indicator may be transmitted in the control channel that carries transmission format information for the packet. Sometimes, a more elaborated version of HARQ channel information, such as sub-packet ID, or even HARQ channel ID, can be transmitted to help the receiver detect and decode the packet.

Multiple antenna communication systems, which is often referred to as multiple input multiple output (MIMO), are widely used in wireless communication to improve system performance. In a MIMO system, the transmitter has multiple antennas capable of transmitting independent signals and the receiver is equipped with multiple receive antennas. MIMO systems degenerates to single input multiple output (SIMO) if there is only one transmission antenna or if there is only one stream of data transmitted. MIMO systems degenerates to multiple input single output (MISO) if there is only one receive antenna. MIMO systems degenerates to single input single output (SISO) if there is only one transmission antenna and one receive antenna. MIMO technology can significant increase throughput and range of the system without any increase in bandwidth or overall transmit power. In general, MIMO technology increases the spectral efficiency of a wireless communication system by exploiting the additional dimension of freedom in the space domain due to multiple antennas. There are many categories of MIMO technologies. For example, spatial multiplexing schemes increase the transmission rate by allowing multiple data streaming transmitted over multiple antennas. Transmit diversity methods such as space-time coding take advantage of spatial diversity due to multiple transmit antennas. Receiver diversity methods utilizes the spatial diversity due to multiple receive antennas. Beamforming technologies improve received signal gain and reducing interference to other users. Spatial division multiple access (SDMA) allows signal streams from or to multiple users to be transmitted over the same time-frequency resources. The receivers can separate the multiple data streams by the spatial signature of these data streams. Note these MIMO transmission techniques are not mutually exclusive. In fact, many MIMO schemes are often used in an advanced wireless systems.

Figure 6:
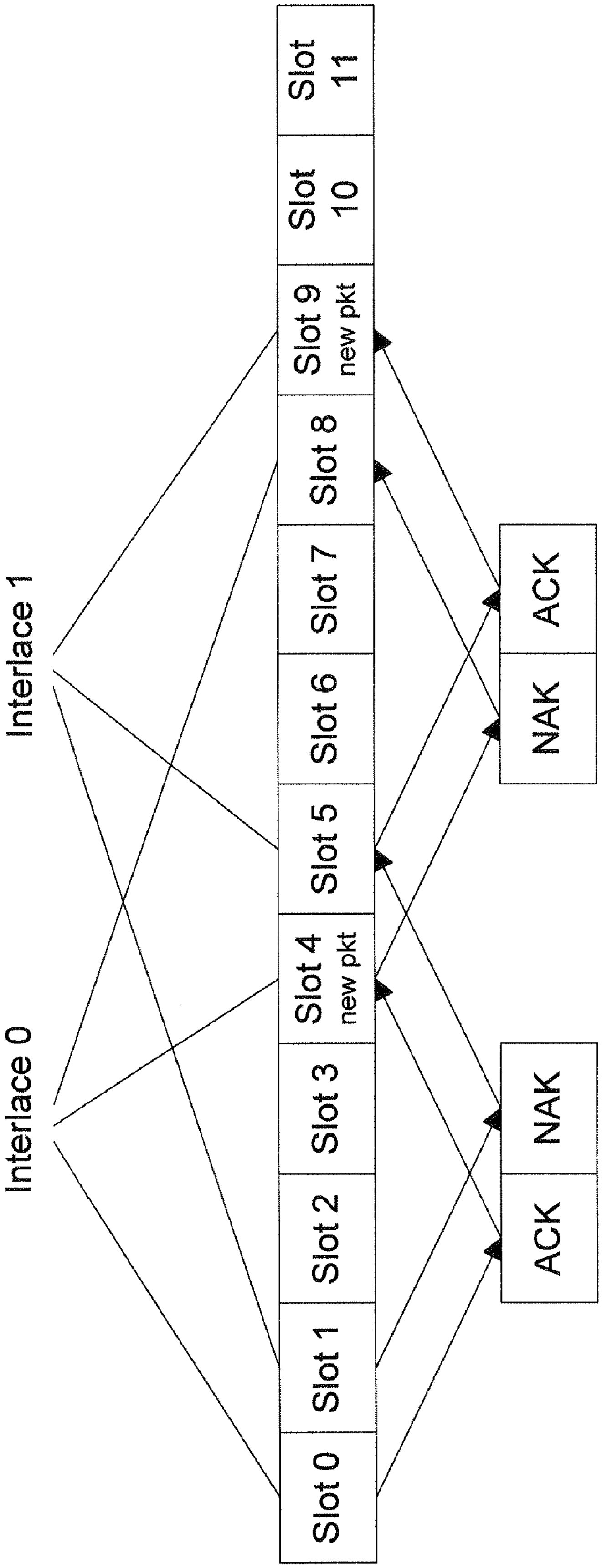
FIG. 6 schematically illustrates a four-channel HARQ transmission scheme.
Figure 7:
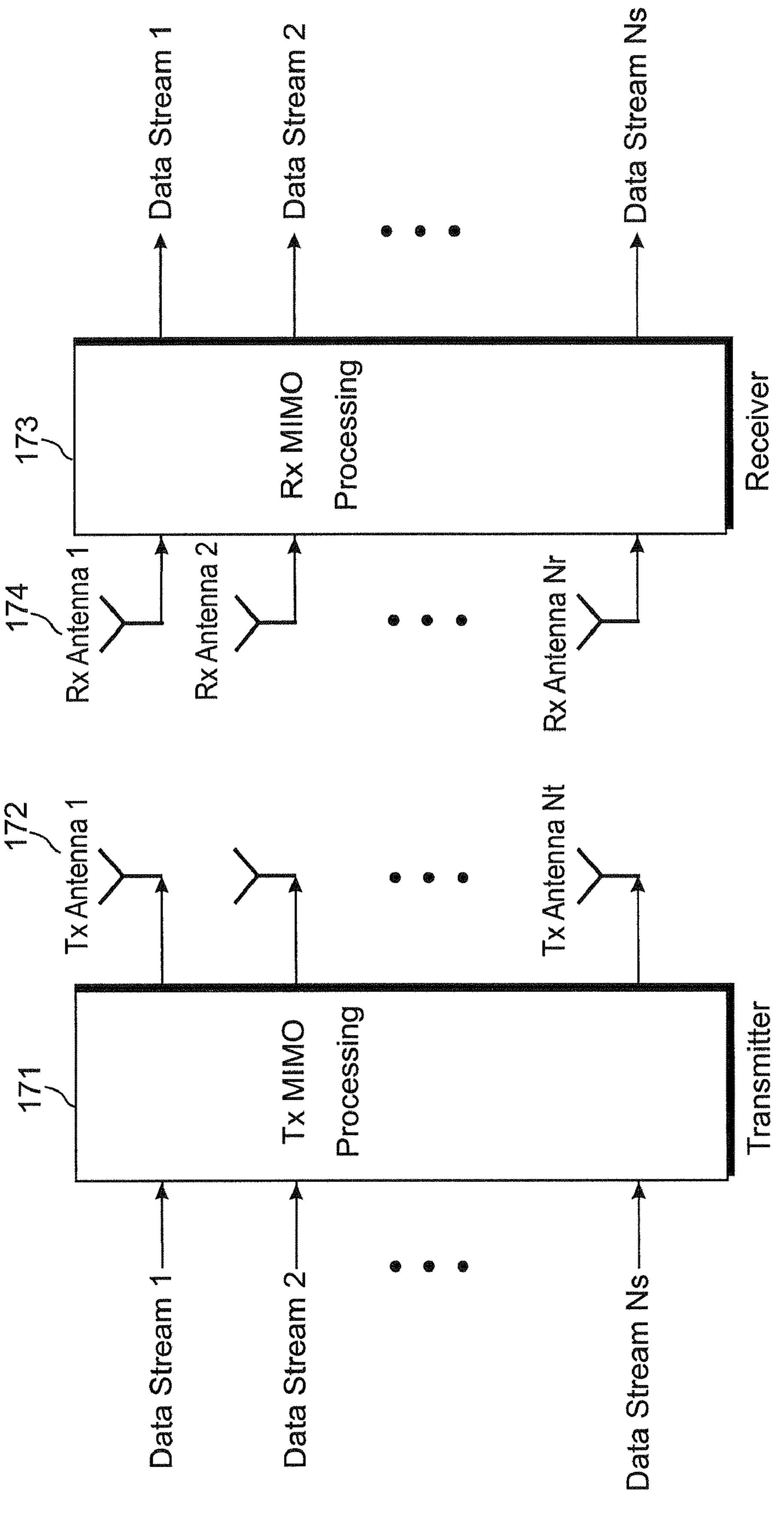
FIG. 7 schematically illustrates a Multiple Input Multiple Output (MIMO) system.
Figure 8:
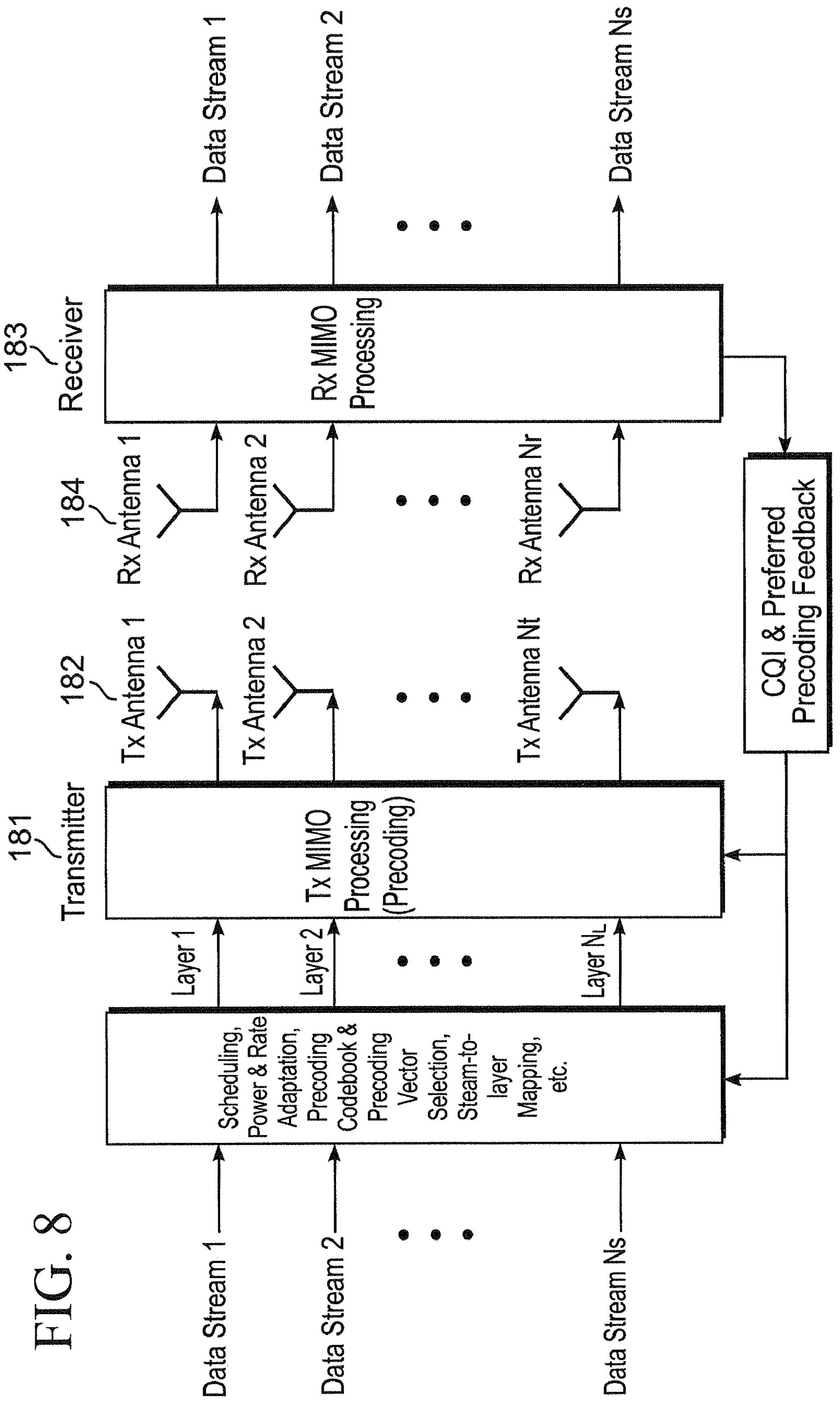
FIG. 8 schematically illustrates a precoded MIMO system.

When the channel is favorable, e.g., the mobile speed is low, it is possible to use closed-loop MIMO scheme to improve system performance. In a closed-loop MIMO systems, the receivers feedback the channel condition and/or preferred Tx MIMO processing schemes. The transmitter utilizes this feedback information, together with other considerations such as scheduling priority, data and resource availability, to jointly optimize the transmission scheme. A popular closed loop MIMO scheme is called MIMO preceding. With precoding, the transmit data streams are pre-multiplied by a matrix before being passed on to the multiple transmit antennas. As shown in FIG. 6, assume there are Nt transmit antennas and Nr receive antennas. Denote the channel between the Nt transmit antennas and the Nr receive antennas as H. Therefore H is an Nt×Nr matrix. If the transmitter has knowledge about H, the transmitter can choose the most advantageous transmission scheme according to H. For example, if maximizing through is the goal, the precoding matrix can be chosen to be the right singular matrix of H, if the knowledge of H is available at the transmitter. By doing so, the effective channel for the multiple data streams at the receiver side can be diagonalized, eliminating the interference between the multiple data streams. However, the overhead required to feedback the exact value of H is often prohibitive. In order to reduce feedback overhead, a set of preceding matrices are defined to quantize the space of the possible values that H could substantiate. With the quantization, a receiver feeds back the preferred preceding scheme, normally in the form of the index of the preferred preceding matrix, the rank, and the indices of the preferred precoding vectors. The receiver may also feed back the associated CQI values for the preferred preceding scheme.

Another perspective of a MIMO system is whether the multiple data streams for transmission are encoded separately or encoded together. If all the layers for transmission are encoded together, we call it a single codeword (SCW) MIMO system. And we call it a multiple codeword (MCW) MIMO system otherwise. In the LTE downlink system, when single user MIMO (SU-MIMO) is used, up to two codewords can be transmitted to a single UE. In the case that two codewords are transmitted to a UE, the UE needs to acknowledge the two codewords separately. Another MIMO technique is called spatial division multiple access (SDMA), which is also referred to as multi-user MIMO (MU-MIMO) sometimes. In SDMA, multiple data streams are encoded separately and transmitted to different intended receivers on the same time-frequency resources. By using different spatial signature, e.g., antennas, virtual antennas, or precoding vectors, the receivers will be able to distinguish the multiple data streams. Moreover, by scheduling a proper group of receivers and choosing the proper spatial signature for each data stream based on channel state information, the signal of interest can be enhanced while the other signals can be enhanced for multiple receivers at the same time. Therefore the system capacity can be improved. Both single user MIMO (SU-MIMO) and multi-user MIMO (MU-MIMO) are adopted in the downlink of LTE. MU-MIMO is also adopted in the uplink of LTE while SU-MIMO for LTE uplink is still under discussion.

Figure 9:
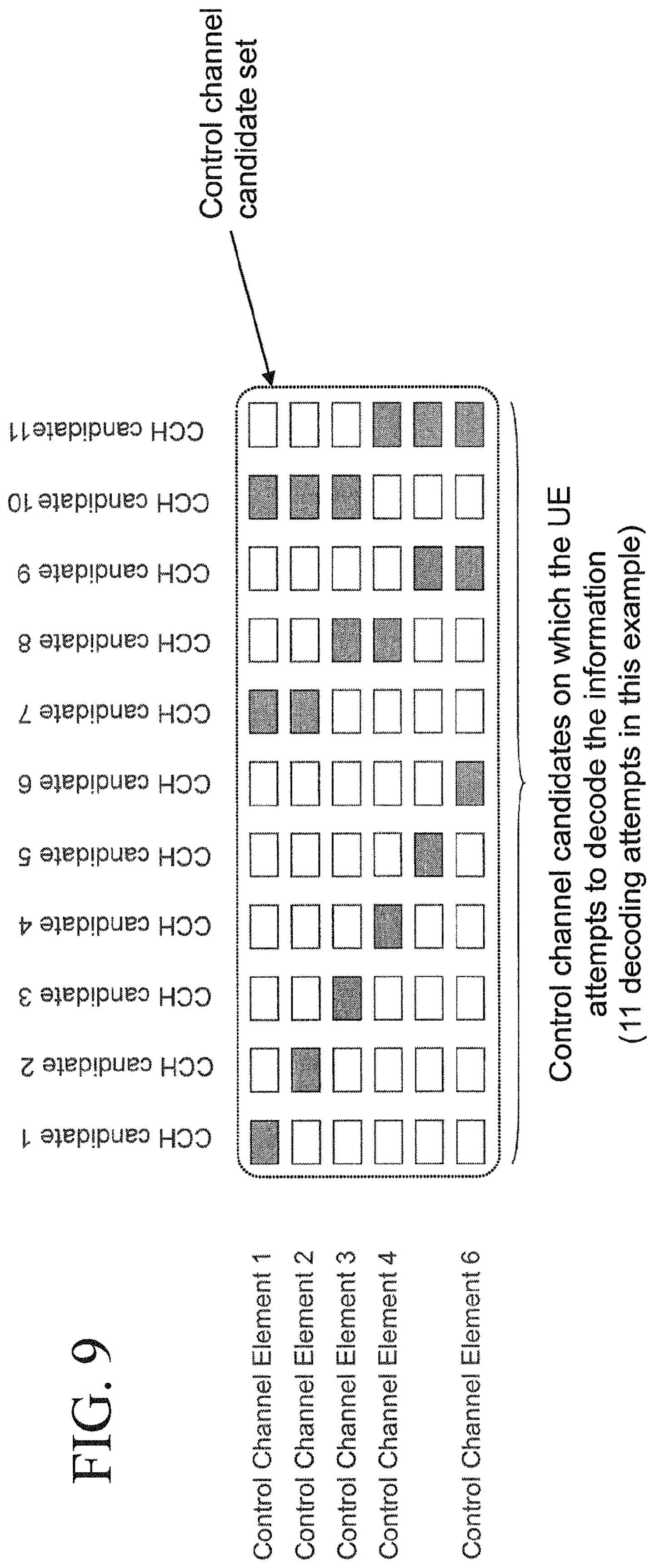
FIG. 9 schematically illustrates LTE downlink control channel elements.

In LTE systems, some resources, namely control channel elements, are reserved for downlink control channel transmission. Control channel candidate set can be constructed based on the control channel elements reserved for downlink control channels. Each downlink control channel can be transmitted on one of the control channel candidate set. An example of control channel elements and control channel candidate set is shown in FIG. 9. In this example, 11 control channel candidate sets can be constructed on 6 control channel elements. In the rest of the document, we will refer to these control channel candidate sets as control channel resource sets, or simply, resource sets.

Figure 10:
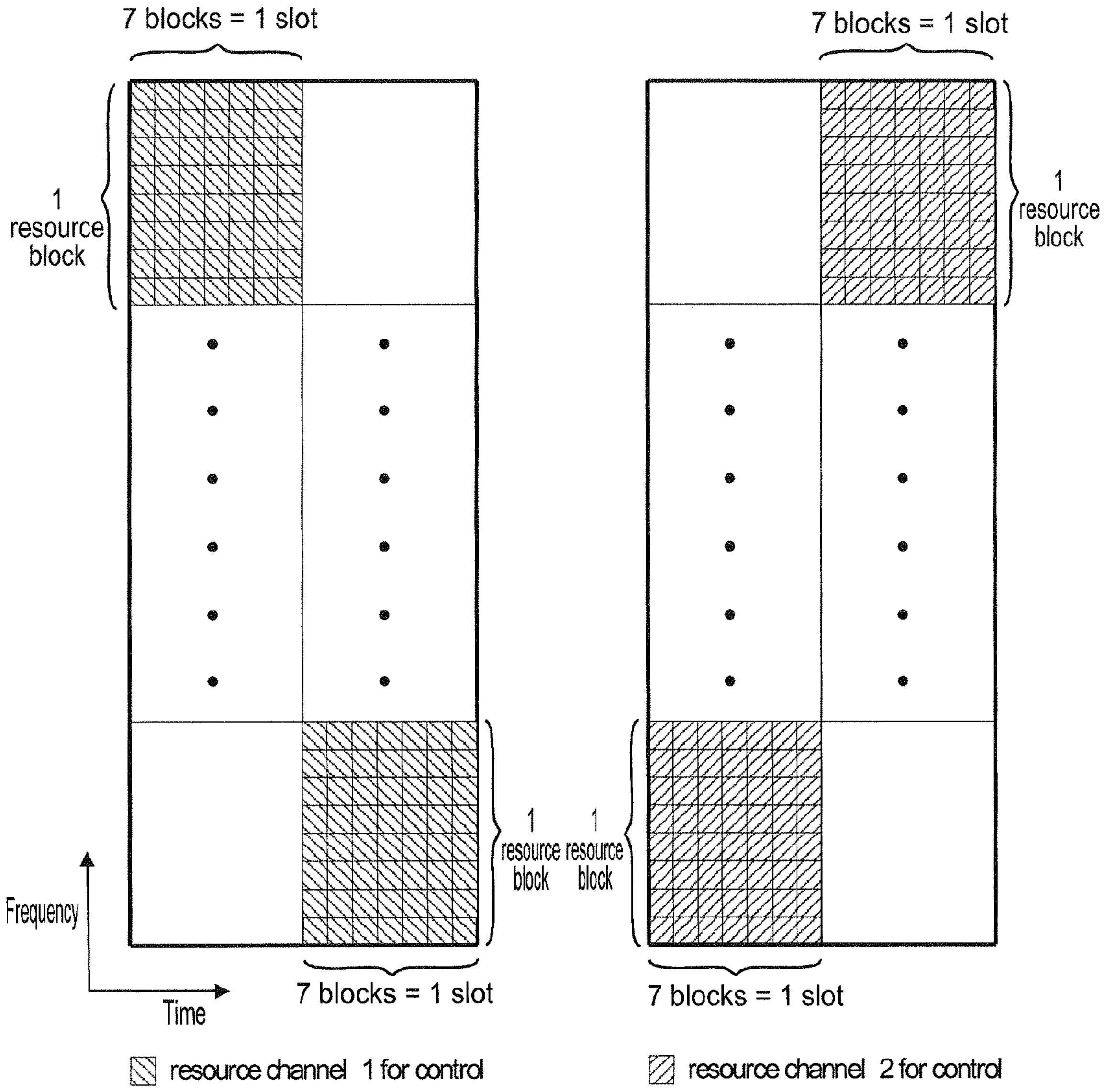
FIG. 10 schematically illustrates a resource allocation scheme for control channels in a SC-FDMA system.

One example of resource allocation for uplink control channels in LTE uplink, a SC-FDMA system, is shown in FIG. 10. Resources at the edge of band are allocated to control channel. Each resource channel for uplink control will hop from one edge of the band to the other edge of the band across the two slots within a subframe to capture frequency diversity while preserving the single-carrier transmission property as the mobile station only transmit within a contiguous frequency block at any given time. ACK channel is transmitted on one of these resource channels in the case there is no uplink data transmission. In the case when there is uplink data transmission, ACK and other uplink control channels can be multiplexed with the data transmission within the resource blocks assigned to that mobile station.

In this invention, we propose methods and apparatus to improve the transmission of acknowledgements.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

In the following illustrations, we use uplink acknowledgement (ACK) channel in 3GPP LTE system as an example. The techniques illustrated here, however, can certainly be applied to downlink acknowledgement channel in LTE systems, and in other channels and other systems whenever applicable.

In a first embodiment according to the principles of the present invention, we propose to establish a functional relationship between the resource assignment for uplink (UL) acknowledgement channels and the resource assignment for downlink control (DL) channels. For example, a one-to-one mapping can be established between the resources, i.e., control channel elements for downlink (DL) control signaling, and the resources for uplink acknowledgement. In the example shown in FIG. 9, there are six control channel elements. These six control channel elements can be combined to form eleven possible resource allocations, which we also call resource sets, for control channels.

Figure 11A:
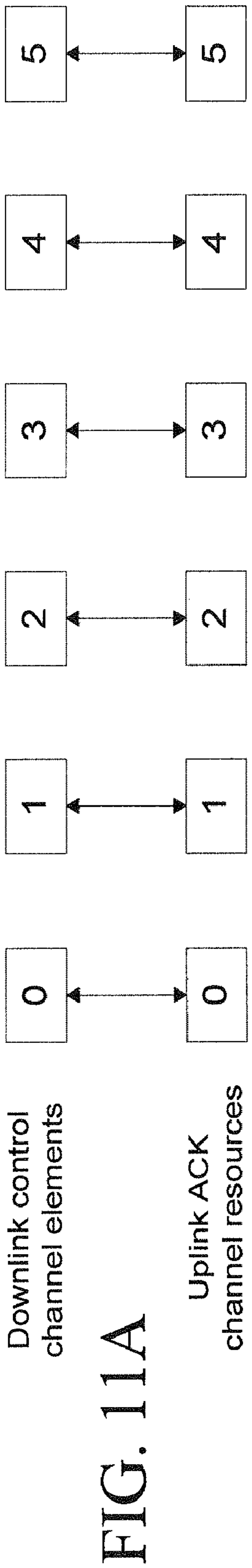
FIGS. 11A, 11B and 11C schematically illustrate mapping schemes of uplink ACK channel resources to downlink control elements according to an embodiment of the principles of the present invention.
Figure 11B:
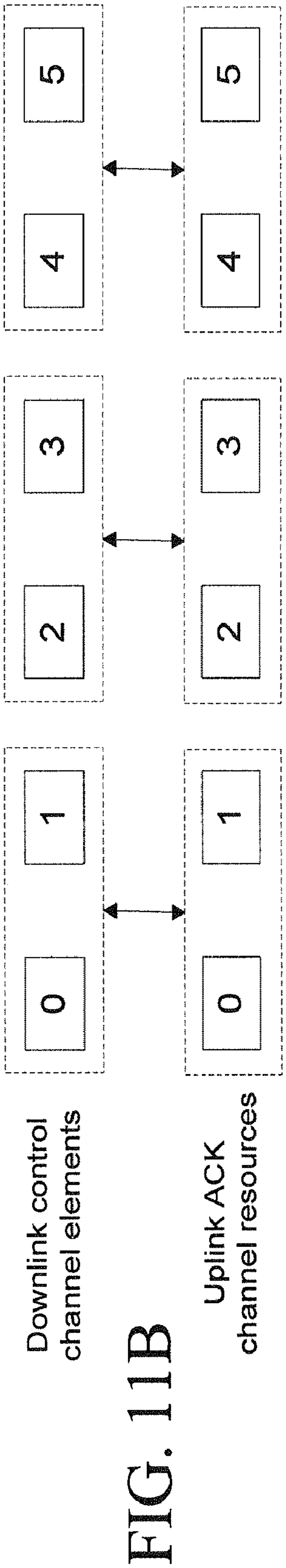
Figure 11C:
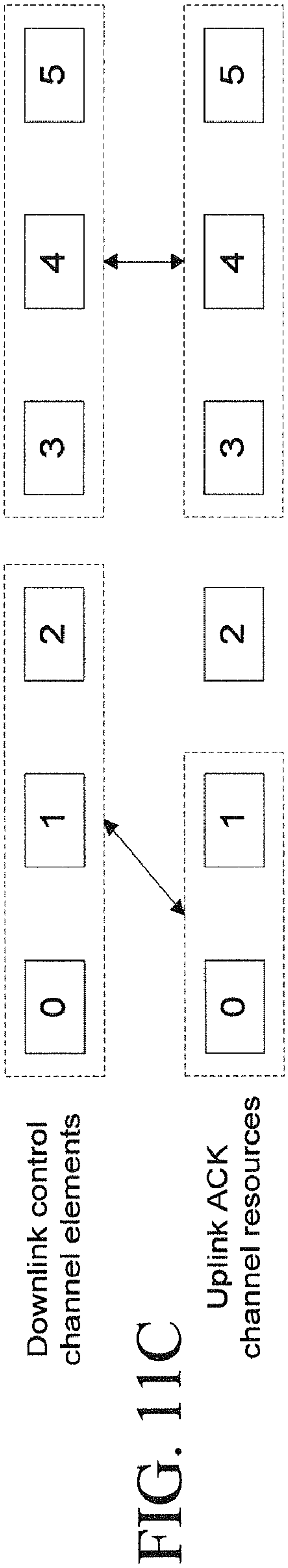

One way to implement the principles of the present invention is to link each control channel element to an uplink ACK channel resource, as shown in FIG. 11A. The uplink ACK channel resource can be constructed from a Zadoff-Chu sequence. The Zadoff-Chu (ZC) sequence of length N is defined as:

$$g_p(n) = \begin{cases} e^{-j\frac{2\pi}{M}\frac{1}{2}pn^2} & \text{when } N \text{ is even} \\ e^{-j\frac{2\pi}{M}\frac{1}{2}pn(n+1)} & \text{when } N \text{ is odd} \end{cases}, n = 0, 1, \ldots, N-1$$

where n is the index of the sample in the Zadoff-Chu sequence, and p is the sequence index and is relatively prime to N (i.e. the only common divisor for p and N is 1). For a fixed p, the Zadoff-Chu (ZC) sequence has ideal periodic auto-correlation property (i.e. the periodic auto-correlation is zero for all time shift other than zero). For different p, ZC sequences are not orthogonal, but exhibit low cross correlation. If the sequence length N is selected as a prime number, there are N−1 different sequences with periodic cross-correlation of $1/\sqrt{N}$ between any two sequences regardless of time shift. The uplink ACK channel resource can be one or a set of Zadoff-Chu sequences with different indices, or one or a set of Zadoff-Chu sequences with different offsets, or one or a set of hopping patterns on a set of Zadoff-Chu sequences or offsets. The offset of a Zadoff-Chu sequence refers to the cyclic offset of the Zadoff-Chu sequence, which is the index of a starting point of the sequence. If the offset is m, the starting point of the sequence is shifted by m samples relative to an original sequence, and the last m samples of the shifted sequence is the first m samples of the original sequence. When an ACK channel message is transmitted in multiple SC-FDMA blocks, the ACK channel message can use a different Zadoff-Chu sequence in each SC-FDMA blocks. The changing pattern of the Zadoff-Chu sequences over SC-FDMA blocks is the hopping pattern of an ACK channel on a set of Zadoff-Chu sequences. Similarly, we can hop the ACK channel over a set of Zadoff-Chu sequence offsets (i.e., cyclic shifts). Other dimensions, including time and frequency, can also be part of the uplink ACK channel resource allocation. For example, an ACK channel can be allocated a ZC sequence cyclic shift (offset) in a resource block. Note the resource block is defined as a number of frequency subcarriers in a few SC-FDMA blocks. So, time and frequency resources also play a role in the definition of uplink ACK channel resources. Assume one downlink control message that contains a downlink scheduling grant to one mobile station is transmitted from a base station using one of the control channel element. After the mobile station detects the control message and attempt to decode the data channel signal transmitted from the base station, the mobile station will need to feedback an ACK or NAK message to the base station. Given the established mapping between the ACK channel resources with the downlink control channel elements, the mobile station knows which ACK channel resource to use to transmit the ACK or NAK message. One key feature of this invention is that this scheme can easily support multiple transmission formats, including overlapping resource allocation schemes as shown in FIG. 9, of downlink control channels. As shown in FIG. 11B, if two (or more than two) control channel elements are used to transmit one downlink control channel message, the uplink ACK resources corresponding to the two control channel elements can be used for the intended mobile station to transmit ACK/NAK feedback. As shown in FIG. 11C, if three control channel elements are used to transmit one downlink control channel message, two or three uplink ACK resources corresponding to these control channel elements can be used for the intended mobile station to transmit ACK/NAK feedback to the base station. In general, if multiple downlink control channel elements are used to transmit one downlink control channel, all or part of the uplink ACK resources corresponding to these downlink control channel elements can be used for the intended mobile station to transmit ACK/NAK feedback to the base station. And different number and selection of the uplink ACK resources can be chosen. For example, a first subset of the uplink ACK resources that correspond to these downlink control channel elements can be chosen to transmit ACK/NAK feedback to the base station; alternatively, a second subset of the uplink ACK resources that correspond to these downlink control channel elements can be chosen to transmit ACK/NAK feedback to the base station. Note that if a subset of uplink ACK resources is used, the base station only needs to detect the ACK channel on the subset of uplink ACK resources.

Figure 12A:
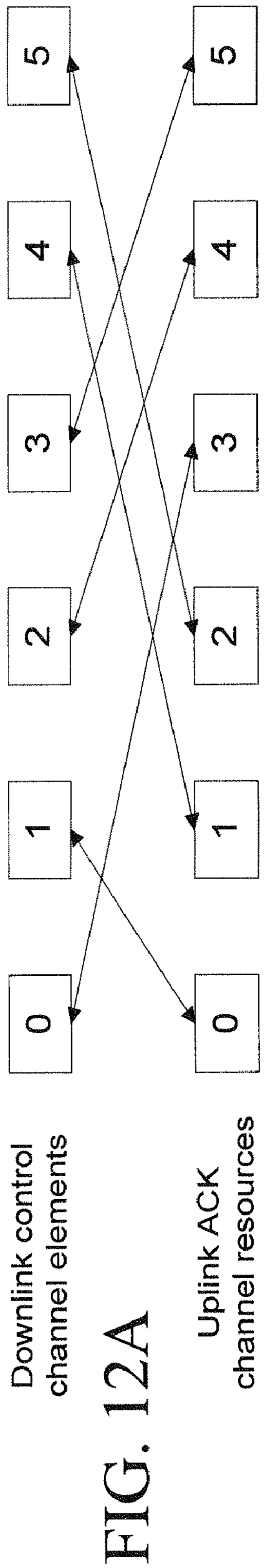
FIGS. 12A, 12B and 12C schematically illustrate mapping schemes of uplink ACK channel resource sets to downlink control element sets according to another embodiment of the principles of the present invention.
Figure 12B:
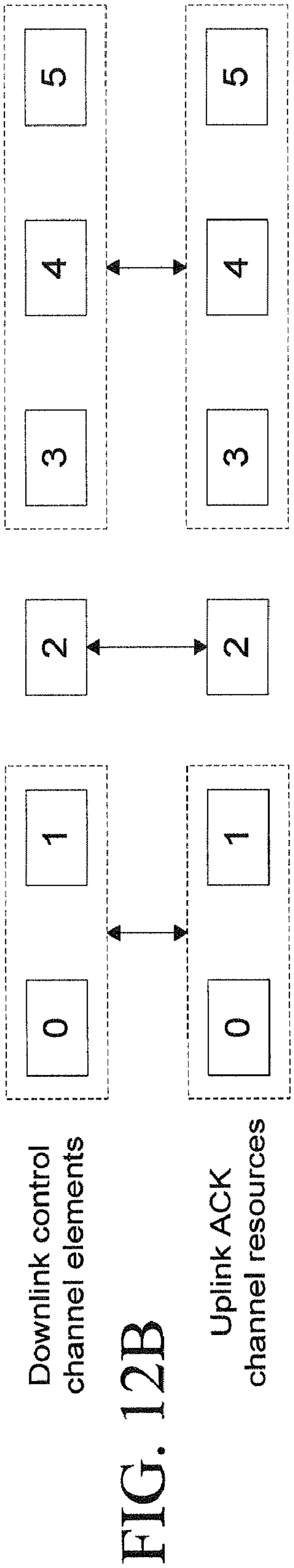
Figure 12C:
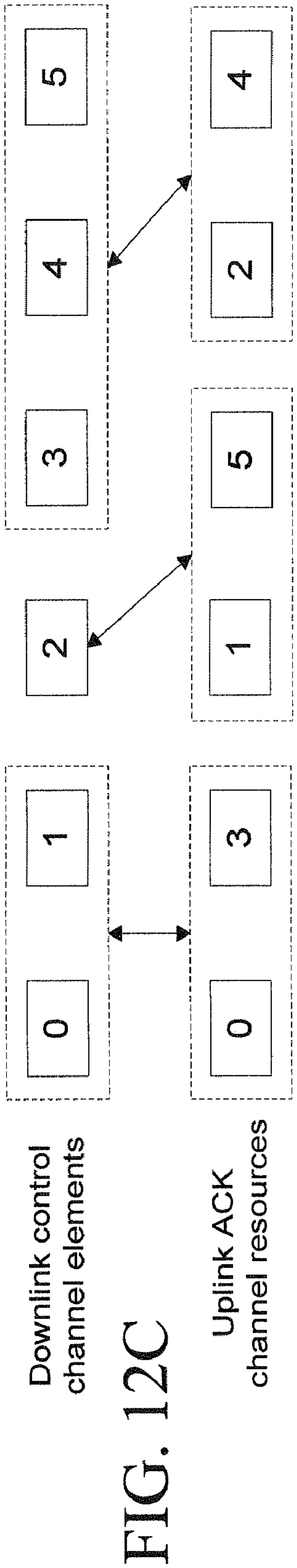

Variations of mapping scheme can be developed based on the principles of this invention. For example, the functional mapping relationship can be established between the downlink control channel resource sets and the uplink ACK channel resources, or uplink ACK channel resource sets according to a second embodiment of the principles of the present invention. FIGS. 12A, 12B, and 12C illustrate a few examples that are covered by this invention. As shown in FIG. 12A, a different mapping is established than the one shown in FIG. 11A. The mapping can change dynamically or be configured in a semi-static fashion, over time, frequency, sector, or any other dimension. As an effect of the changing of the mapping from downlink control channel resource sets to uplink ACK channel resources over time, frequency, or sector, the mapping may change in the code, or sequence sets. The mapping can change at different scale along each dimension. For example, over time, the mapping can change every OFDM symbol or SC-FDMA block. The mapping can change every a few OFDM symbols or SC-FDMA blocks. The mapping can change every one or a few slots, subframes, or frames, depending on many other system design and operation constraints and considerations. As shown in FIG. 12B, downlink control channel resource sets with different size can be used simultaneously. Likewise, uplink ACK channel resource sets with different size can be used simultaneously. Furthermore, the mapping established between downlink control channel resource sets and uplink ACK channel resource sets can be independent from the mapping established between downlink control channel elements and uplink ACK channel resources. As shown in FIG. 12C, the downlink control channel resource set {0, 1} is mapped to uplink ACK resource set {0, 3}, the downlink control channel resource set {2} is mapped to uplink ACK resource set {1, 5}, the downlink control channel resource set {3, 4, 5} is mapped to uplink ACK resource set {2, 4}.

Figure 13:
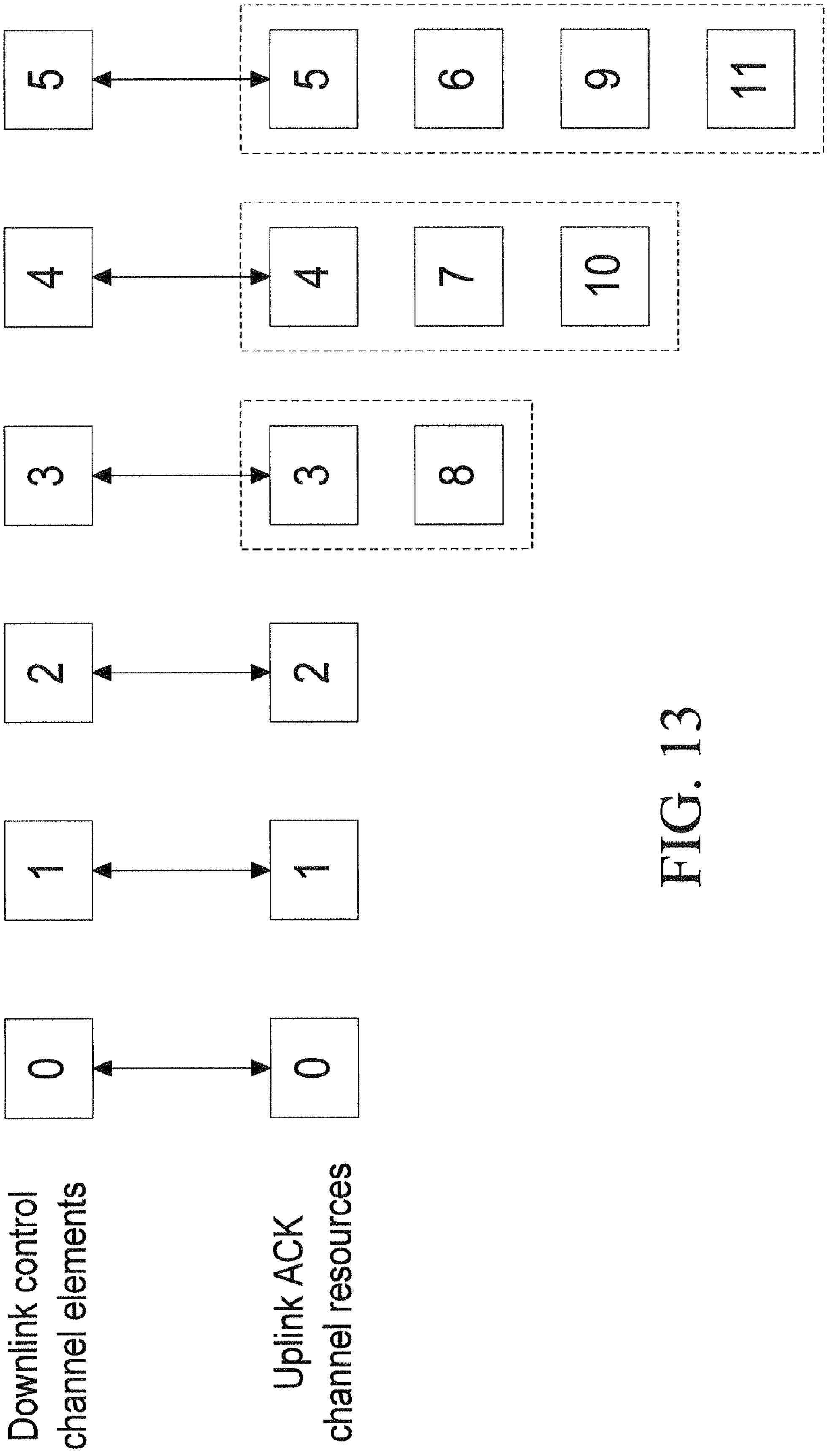
FIG. 13 schematically illustrates a mapping scheme of uplink ACK channel resource sets to downlink control element sets according to another embodiment of the principles of the present invention.

In a third embodiment according to the principles of the present invention, at least one of the downlink control channels or downlink control channel elements can be mapped to multiple ACK channel resources. For example, as shown in FIG. 13, downlink control element 4 is mapped to uplink ACK channel resource 4, 7 and 10. If a mobile station receives a scheduling grant that is transmitted using downlink control channel element 4, the mobile station will attempt to transmit the multiple acknowledgements using ACK channel resource 4, 7, 10. By doing so, the base station can use these downlink control channel elements to schedule those transmissions whose acknowledgement(s) requires multiple ACK channel resources. For example, MIMO transmissions may require multiple uplink ACK resources. Some mobile station may be configured to use certain ACK feedback schemes that require multiple uplink ACK resources, for a single ACK or multiple ACKs.

In a fourth embodiment according to the principles of the present invention, at least one downlink control element or one set of downlink control elements are mapped to a set of uplink ACK resources. The said set of uplink ACK resources can be used to support transmission of multiple ACKs. Note that it is certain within this invention's intention that the set of uplink ACK resources can also be used for some other purposes. And the idea of resource set mapping can be easily extended to other control channels as well. Downlink control signaling associated with downlink transmission that requires multiple acknowledgements are transmitted by using the one downlink control channel element or the set of downlink control elements. The intended mobile station then knows which ACK channel resources to use to transmit the multiple ACKs according to this mapping. One example is to establish the mapping based on the one-to-one mapping between control channel elements and ACK channel resource. Assuming there is a one-to-one mapping between control channel elements 0-5 and the uplink ACK channel resources 0-5, ACK channel resource sets can be constructed according to the sets of downlink control channel elements. For example, the mapping can be established as shown in Table 1.

TABLE 1

Example of resource set mapping between downlink control and uplink ACK.

| Downlink control channel element or set of elements | Uplink ACK channel resource sets |
|---|---|
| {0} | {0} |
| {1} | {1} |
| {2} | {2} |
| {3} | {3} |
| {4} | {4} |
| {5} | {5} |
| {0, 1} | {0, 1} |
| {2, 3} | {2, 3} |
| {4, 5} | {4, 5} |
| {0, 1, 2} | {0, 1, 2} |
| {3, 4, 5} | {3, 4, 5} |

As seen from Table 1, the downlink control channel element sets may overlap with each other. For example, in Table 1, both of the downlink control channel element set {2, 3} and the downlink control channel element set {0, 1, 2} contain the same downlink control channel element 2. Similarly, the uplink ACK channel resource set may overlap with each other.

Figure 14:
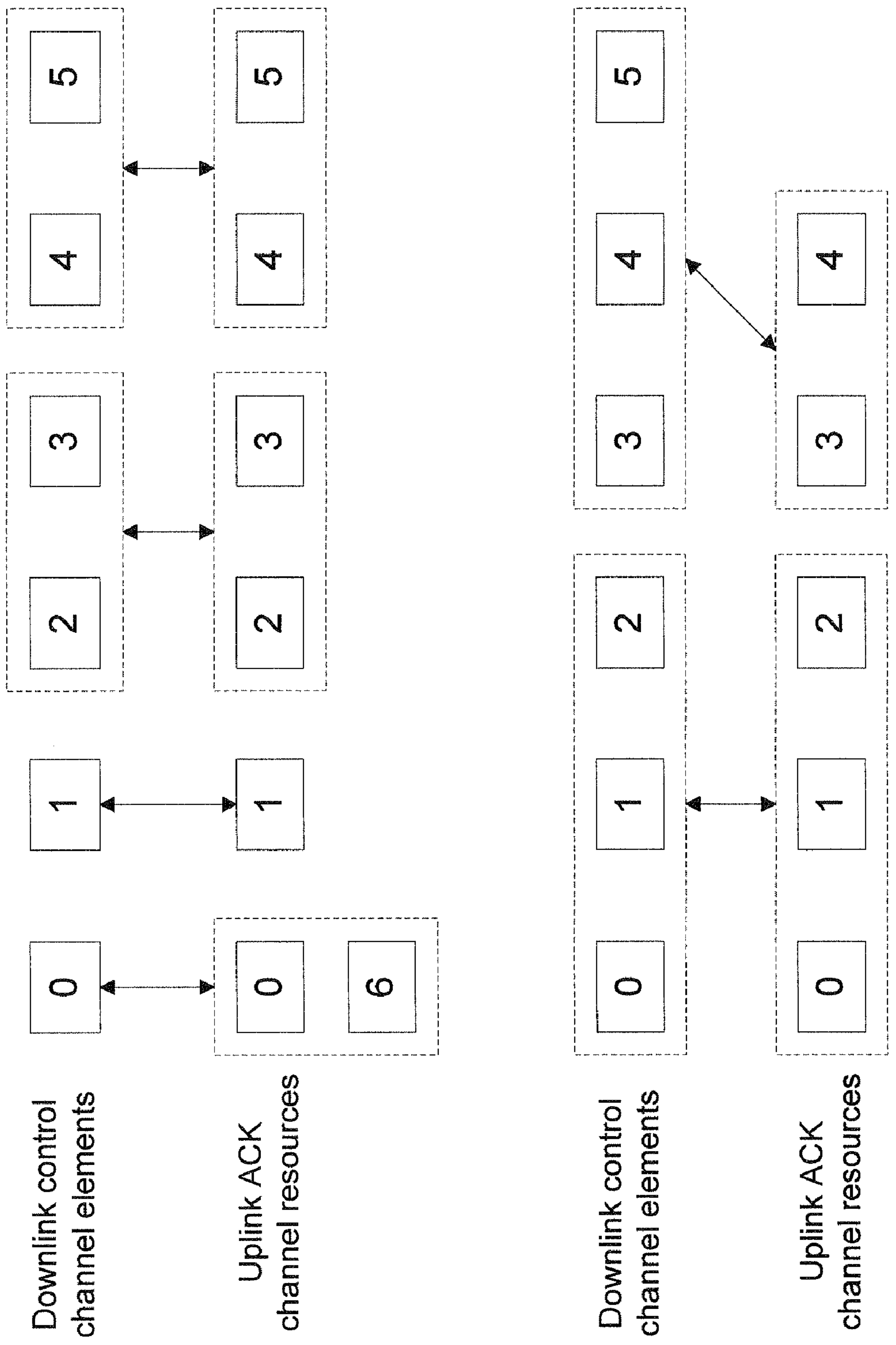
FIG. 14 schematically illustrates a mapping scheme of uplink ACK channel resource sets to downlink control element sets according to another embodiment of the principles of the present invention.

Alternatively, more sophisticated mapping can be established. An example is shown in FIG. 14 according to a fifth embodiment of the principles of the present invention. In this example, the mapping from downlink control elements and sets constructed based on these elements to uplink ACK resource sets can be listed as in Table 2.

TABLE 2

Mapping from downlink control channel resource sets to uplink ACK channel resource sets.

| Downlink control channel element or set of elements | Uplink ACK channel resource sets |
|---|---|
| {0} | {0, 6} |
| {1} | {1} |
| {2, 3} | {2, 3} |
| {4, 5} | {4, 5} |
| {0, 1, 2} | {0, 1, 2} |
| {3, 4, 5} | {3, 4} |

By doing one or a combination of the aforementioned embodiments of mappings, there is no, or reduced, need of explicitly signaling ACK channel resources. This feature is particularly beneficial in ACK resource allocation for multiple ACKs. For example, a base, station can use those downlink control elements sets that are mapped to multiple ACK resources to transmit downlink grant messages that are associated with downlink data transmission that requires multiple acknowledgements. In this case, the intended mobile station is implicitly assigned multiple ACK channel resources to transmit multiple acknowledgements.

Figure 15A:
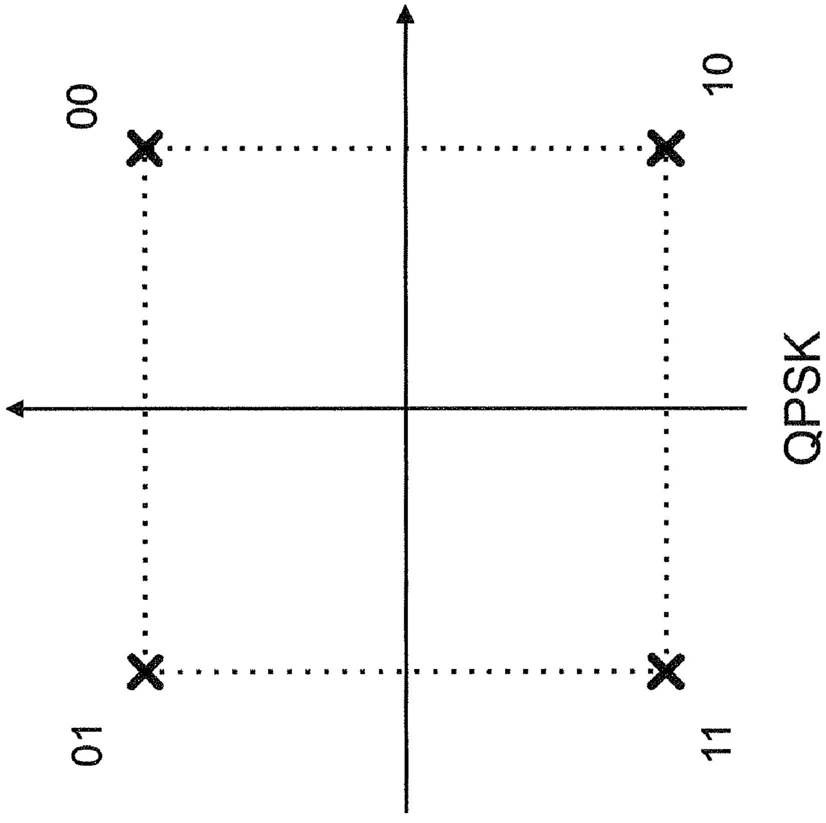
FIG. 15A schematically illustrates a comparative example of a keying scheme for transmitting two acknowledgement channel messages.
Figure 15B:
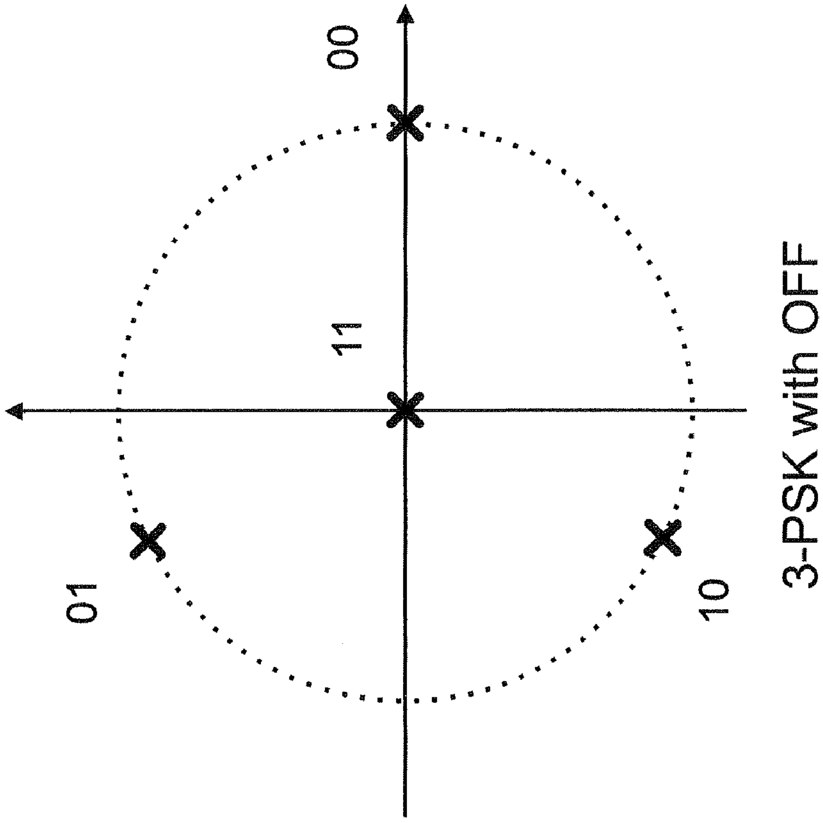
FIG. 15B schematically illustrates a keying scheme for transmitting two acknowledgement channel messages according to one embodiment of the principles of the present invention.

In a six embodiment according to the principles of the present invention, phase-shift-keying (PSK) with no transmission (OFF state in On-Off keying) is used to transmit multiple acknowledgement feedbacks. On-Off keying is modulation scheme that represents digital data as the presence (ON state) or absence (OFF state) of a carrier wave. Sometimes, one mobile station may need to feedback multiple acknowledgements due to, e.g., multiple streams of MIMO transmission. As an example, let's assume two acknowledgements need to be transmitted and assume coherent detection is possible. One scheme is to transmit the two ACK or NAK messages using QPSK as shown in of FIG. 15A. In this invention, we propose to use 3-PSK with OFF state to transmit two acknowledgements. An example is shown in FIG. 15B. We also propose to assign the OFF state to the event that both acknowledgements are NAK. One benefits of this design is lower average power consumption. In a wireless system with hybrid ARQ (HARQ), the packet error rate of the initial transmissions is often high in order to take full advantage of the capacity and diversity gain of HARQ. The result is that the mobile stations often feedback more NAKs than ACKs. In this case, it is more advantageous to set NAK to be the OFF state which does not consume any energy. With a high probability that NAK is transmitted, overall the acknowledgement message transmitted using PSK with an OFF state as shown in FIG. 15B, consumes less energy than the acknowledgement message transmitted using QPSK as shown in FIG. 15A.

The number of ACKs that need to be fed back may change over an HARQ session. For example, in a MIMO transmission, multiple codewords may be transmitted. In order for a mobile station to acknowledge some or all of these codewords, multiple ACKs are needed. As the HARQ session progresses, i.e., retransmissions, however, some of the codewords will be successfully decoded before the others. In the subsequent retransmissions that include those codewords that have not been successfully decoded, the number of ACKs that need to be fed back may be reduced.

Figure 16A:
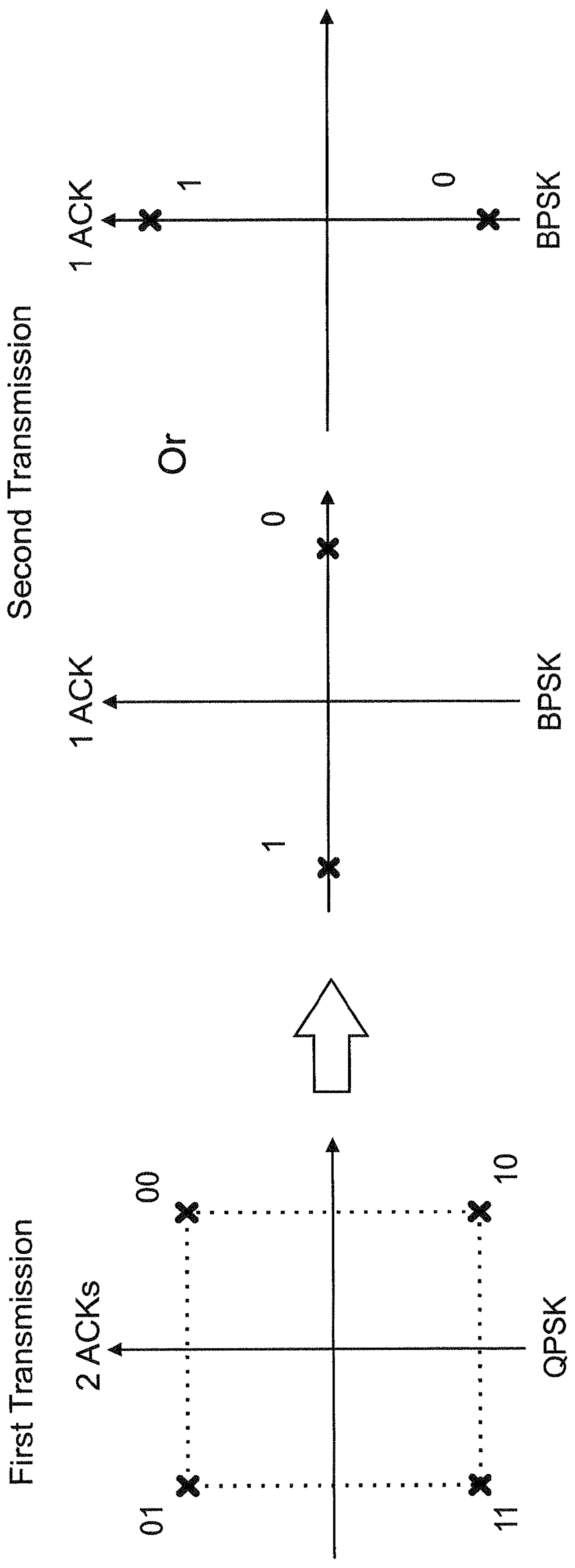
FIG. 16A schematically illustrates a comparative example of keying schemes for transmitting and retransmitting two acknowledgement channel messages.
Figure 16B:
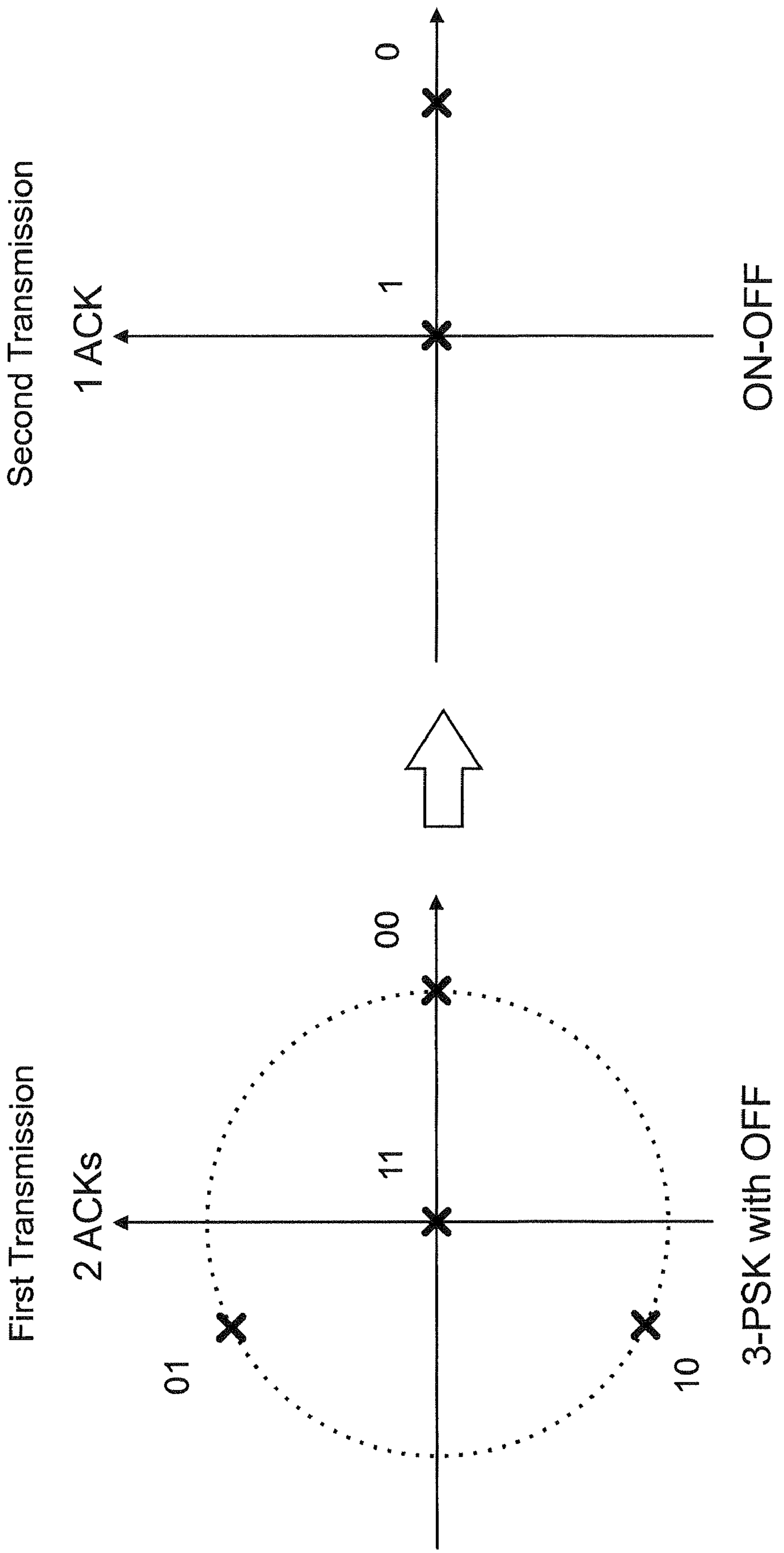
FIG. 16B schematically illustrates a keying scheme for transmitting two acknowledgement channel messages and retransmitting one acknowledgement channel message according to one embodiment of the principles of the present invention.

FIGS. 16A and 16B illustrate examples of changing the number of ACK channel messages in a seventh embodiment according to the principles of the present invention. If two codewords are transmitted to a mobile station, the mobile station may transmit two ACK channel messages using QPSK as shown in FIG. 16A. If codeword-1 is correctly received after the initial transmission, the mobile station feeds back {ACK1=ACK, and ACK2=NAK}. Assuming the base station does not transmit new data on codeword-1, the retransmission will only contain data of codeword-2. In that case, the mobile station will only need to feedback ACK2 using BPSK. In this invention, we propose to change the keying scheme and constellation for ACK channel in the case of these events. As shown in FIG. 16B, 3-PSK with OFF can be used to feedback two ACKs. In the case that one of the codeword is successfully decoded and only one ACK is needs to be fed back, we can change the keying scheme of ACK channel to ON-OFF keying.

In an eighth embodiment according to the principles of the present invention, we can use one ACK to acknowledge transmission of multiple codewords or packets. For example, if there are two codewords in a MIMO transmission and a mobile station is attempt to decode and acknowledge both of the two codewords, normally two ACKs will be needed. In the case that the mobile station is capable of successive-interference-cancellation, however, one ACK channel can be used to acknowledge both of the codewords. In the event that one codeword, for example, codeword-1, is correctly received but codeword-2 is not correctly received, the mobile station can feedback NAK. The base station will continue to retransmit as if none of the codewords is correctly received. Because the mobile station is capable of successive-interference-cancellation (SIC), the mobile station can reconstruct the signal of codeword-1 that has been already correctly decoded and cancel the signal of codeword-1 from the retransmission signal. By doing so, the mobile station effectively retransmits codeword-2 without the interference from codeword-1. The mobile station will signal ACK if both of the codewords are correctly received.

In a ninth embodiment according to the principles of the present invention, we propose to use multiple ACK resources for at least one of the downlink control channels. An example is shown in FIG. 13. Multiple ACK resources may be necessary for transmission of multiple acknowledgements due to various reasons. For example, if non-coherent signaling scheme is used for ACK channel, more than one ACK channel resource may be needed to transmit two ACKs. There are different ways of non-coherent signaling schemes to transmit two ACKs using multiple ACK channel resources. One example is shown in Table 3. Four distinct ACK channel resources, i.e., four Zadoff-Chu sequences with different, are used to signal the four states of the two ACKs.

TABLE 3

| Using four ACK resources to represent two ACKs | | |
|---|---|---|
| ACK resource | ACK1 | ACK2 |
| ZC sequence offset $k_1$ | NAK | NAK |
| ZC sequence offset $k_2$ | NAK | ACK |
| ZC sequence offset $k_3$ | ACK | NAK |
| ZC sequence offset $k_4$ | ACK | ACK |

Another example is to use three distinct ACK channel resources to signal the four states of the two ACKs, as shown in Table 4.

TABLE 4

| Using three ACK resources and OFF to represent two ACKs | | | | |
|---|---|---|---|---|
| ACK1 | ACK2 | ACK resource 1 | ACK resource 2 | ACK resource 3 |
| NAK | NAK | OFF | OFF | OFF |
| NAK | ACK | ON | OFF | OFF |
| ACK | NAK | OFF | ON | OFF |
| ACK | ACK | OFF | OFF | ON |

Alternatively, two distinct ACK channel resources can be used to signal the four states of the two ACKs, as shown in Table 5.

TABLE 5

| Using two ACK resources to represent two ACKs | | | |
|---|---|---|---|
| ACK1 | ACK2 | ACK resource 1 | ACK resource 2 |
| NAK | NAK | OFF | OFF |
| NAK | ACK | ON | OFF |
| ACK | NAK | OFF | ON |
| ACK | ACK | ON | ON |

Here we emphasize that time and frequency can also be dimensions in specifying the ACK channel resources. Although two ACK resources are both turned “ON” to represent the state of “ACK1=ACK, ACK2=ACK”, at any given time instant, there may only be power allocated to one ACK resource if the two ACK resources are time division multiplexed (TDM).

As a straightforward extension, the aforementioned embodiments can be easily combined. In addition, the aforementioned embodiments can be used to other channels on both the downlink and uplink, and systems other than OFDMA or single-carrier FDMA (SC-FDMA) systems. As an illustration, another embodiment according to the principles of the present invention is to map the downlink control channel resource elements to the downlink ACK channel resources. Note that each downlink ACK channel resource may already be a set of sub-carriers or resource elements. We can also map the downlink control channel resource sets to the downlink ACK channel resource sets. With a defined mapping, the base station transmits an uplink scheduling grant to a mobile station using a downlink control channel resource set. The mobile station will be able to decide the associated downlink ACK channel resources based on the resource set used for this uplink scheduling grant. Therefore, after an uplink transmission according to the uplink scheduling grant, the mobile station will be able to detect the downlink ACK feedback. By doing so, explicitly downlink ACK resource allocation is avoided. And this feature can easily accommodate the scenario that multiple downlink control channel resource sets are constructed based on a few downlink control channel elements. Similarly, all the aforementioned embodiments about uplink ACK channel are applicable to the downlink ACK channel.

Figure 17:
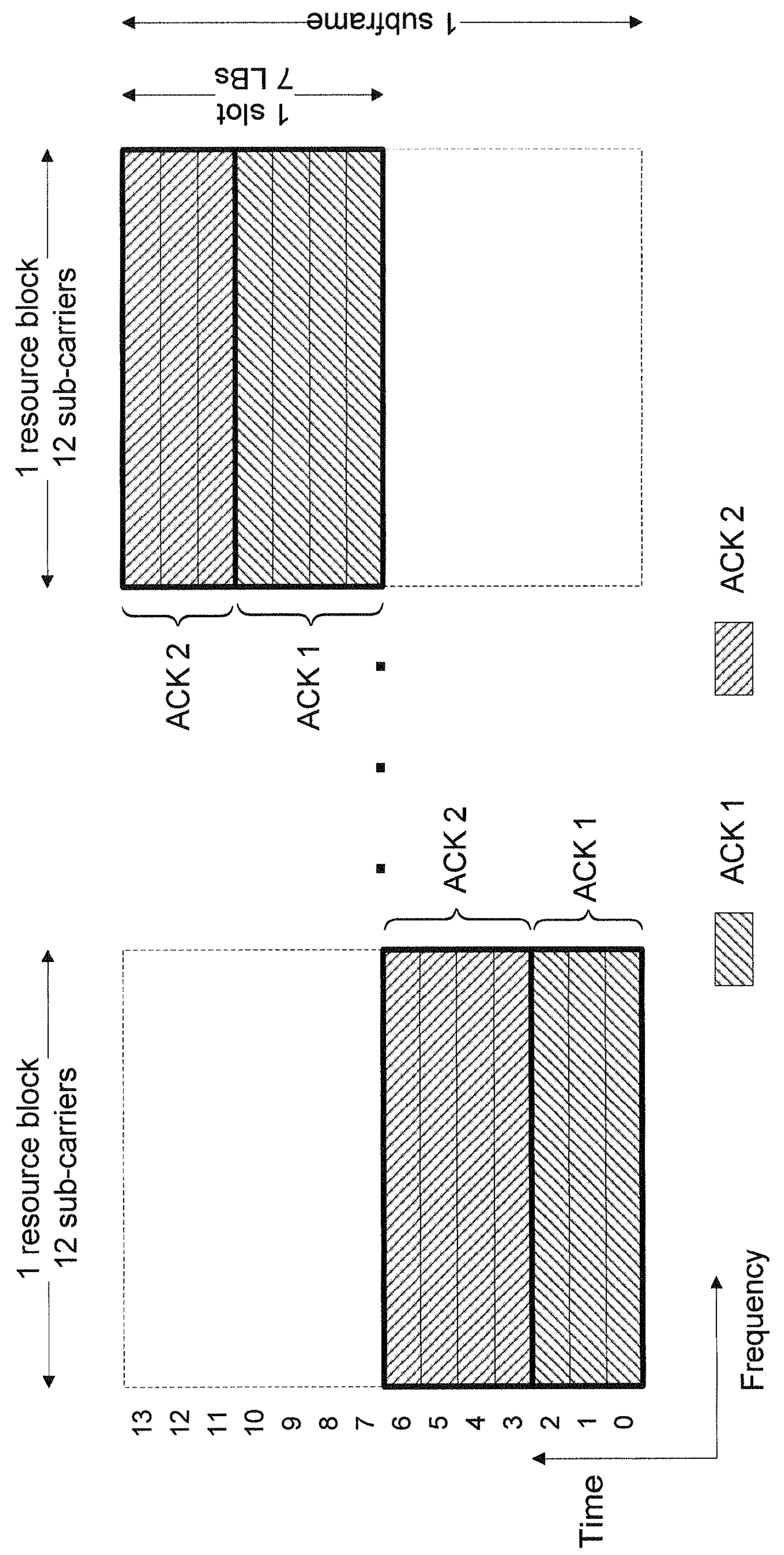
FIG. 17 schematically illustrates time division multiplexing (TDM) of two acknowledgement channel messages on different SC-FDMA blocks according to one embodiment of the principles of the present invention.

In a tenth embodiment according to the principles of the present invention, we propose to multiplex multiple acknowledgements at different SC-FDMA blocks or OFDM symbols. Assume there are two acknowledgement signals ACK 1 and ACK 2 to transmit. One example is shown in FIG. 17. FDMA block 0, 1, 2, 7, 8, 9, 10 are used to carry ACK 1 while SC-FDMA block 3, 4, 5, 6, 11, 12, 13 are used to carry ACK 2. The multiplexing of ACK messages at different SC-FDMA blocks may be achieved by input different ACK messages at the input port of the transmission change as shown in FIG. 4.

Figure 18:
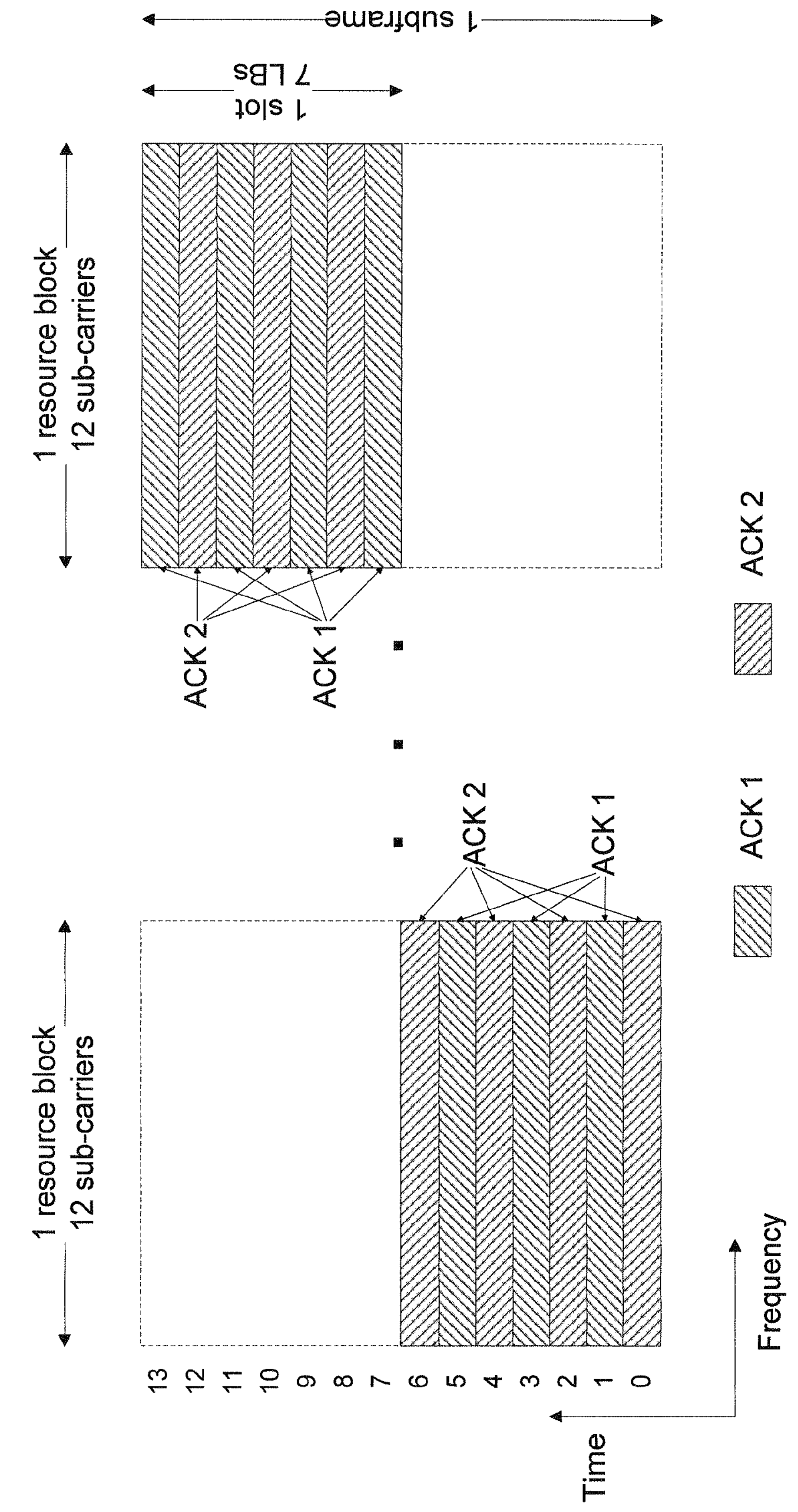
FIG. 18 schematically illustrates time division multiplexing (TDM) of two acknowledgement channel messages on different SC-FDMA blocks according to another embodiment of the principles of the present invention.

Certainly, the SC-FDMA blocks used to carry each ACK need not be to contiguous. In an eleventh embodiment according to the principles of the present invention as shown in FIG. 18, SC-FDMA block 0, 2, 4, 6, 8, 10, 12 are used to carry ACK 2 while SC-FDMA block 1, 3, 5, 7, 9, 11, 13 are used to carry ACK 1. In addition, some SC-FDMA blocks can be used to transmit other signals instead of acknowledgement signals. For example, some SC-FDMA blocks can be used to carry reference signals (RS) to facilitate coherent detection of uplink control or data transmission.

The keying scheme of ACK 1 and ACK 2 can be either ON-OFF, BPSK, or orthogonal signaling. Orthogonal signaling means using two ACK resources, i.e., two ZC sequence with different offsets, to transmit the acknowledgement with one sequence for the ACK and the other for the NAK. For example, a first ZC sequence with a first offset is transmitted when the ACK channel message is ACK; a second ZC sequence with a second offset is transmitted when the ACK channel message is NAK.

Figure 19:
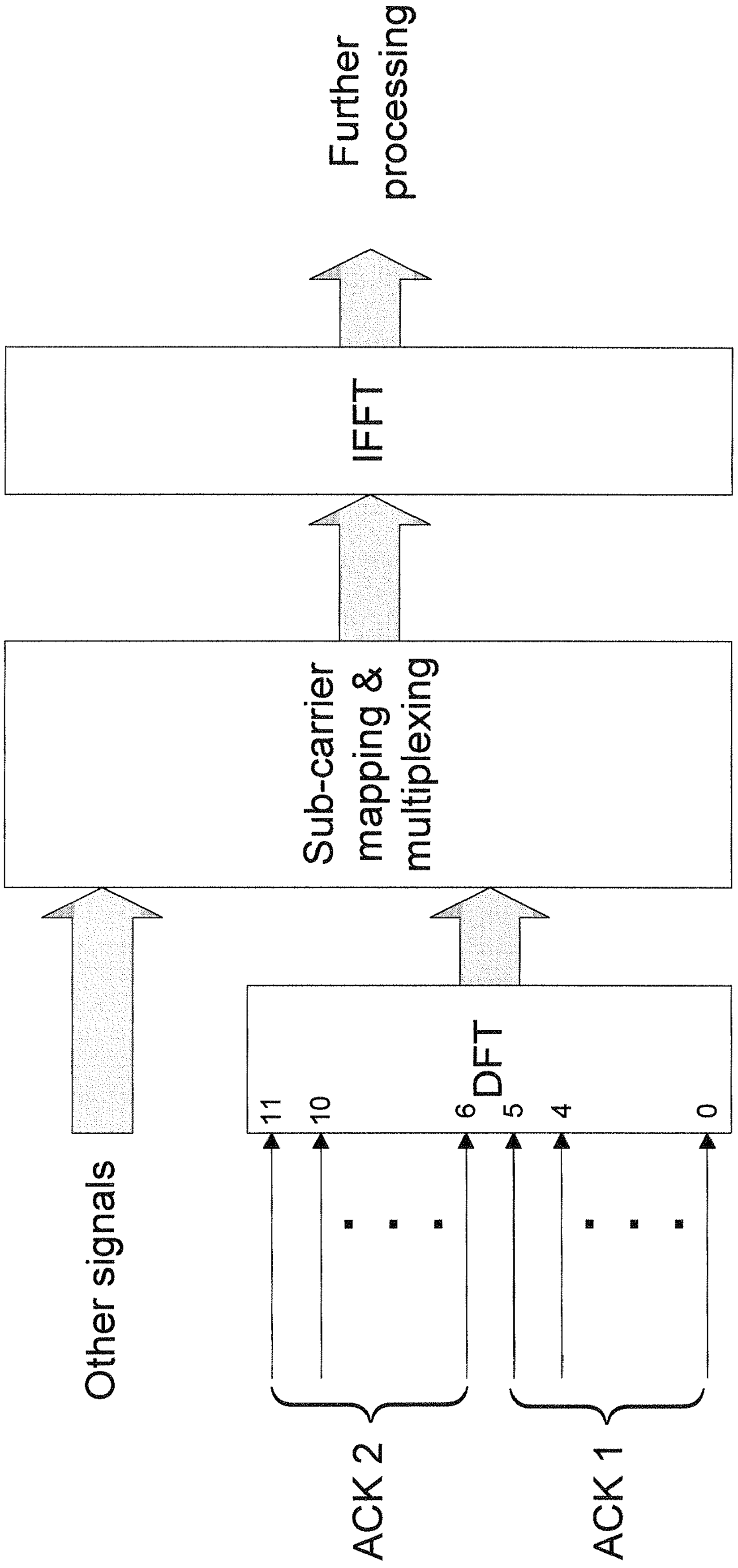
FIG. 19 schematically illustrates time division multiplexing (TDM) of two acknowledgement channel messages on different DFT input ports according to one embodiment of the principles of the present invention.
Figure 20:
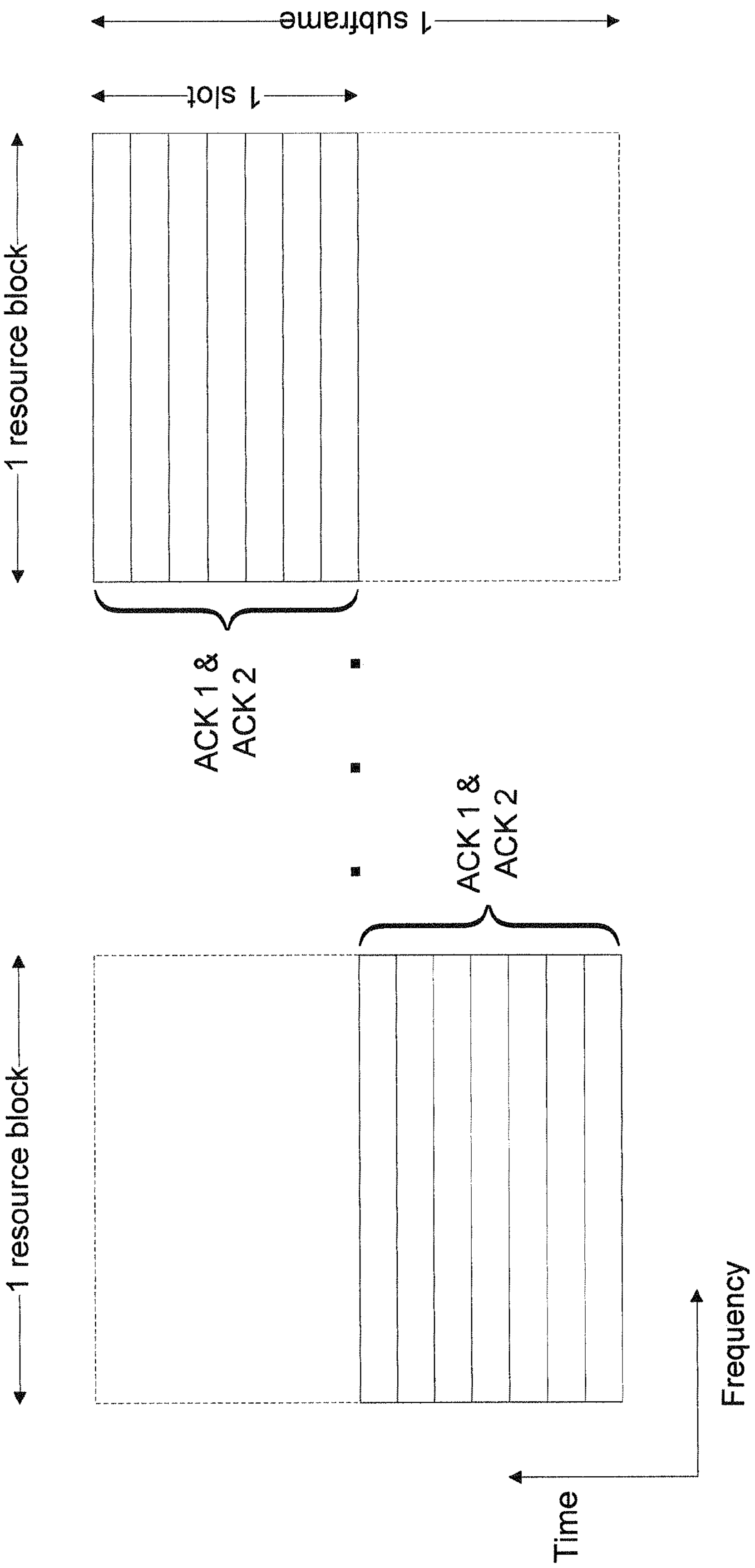
FIG. 20 schematically illustrates time division multiplexing (TDM) of two acknowledgement channel messages on different DFT input ports according to another embodiment of the principles of the present invention.

In a twelfth embodiment according to the principles of the present invention, multiple acknowledgements are multiplexed at different DFT inputs in the SC-FDMA chain. One example is shown in FIG. 19. ACK 1 is carried on DFT inputs 0, 1, 2, 3, 4, 5, while ACK 2 is carried on DFT input 6, 7, 8, 9, 10, 11. By doing so, ACK 1 and ACK 2 are multiplexed at the DFT inputs, i.e., the time domain. The signal of both ACK 1 and ACK 2 will be present, however, in the same SC-FDMA block (as shown in FIG. 20). Note FIG. 20 only shows the processing for one SC-FDMA block. Same processing should be done for those SC-FDMA blocks that carry ACK 1 and ACK 2.

Certainly, the DFT inputs used to carry each ACK need not be to contiguous. In a thirteenth embodiment according to the principles of the present invention, DFT inputs 0, 2, 4, 6, 8, 10 can be used to carry ACK 2 while DFT inputs 1, 3, 5, 7, 9, 11 can be used to carry ACK 1. In addition, acknowledgement can also be multiplexed with data or other control signals at the DFT input. For example, some DFT inputs can be used to transmit other signals instead of acknowledgement signals. For example, some DFT inputs can be used to carry data or reference signals (RS).

As described above, the present invention provides methods to efficiently transmit data and acknowledgement channel messages (ACK or NAK) in an SC-FDMA system. These methods can be implemented in a multi-user MIMO system, in which each user can transmit multiple acknowledgement channel messages.

While the present invention has been described with reference to exemplary embodiments thereof, it will be understood by those skilled in the art that various changes in form and detail may be made therein without departing from the scope of the present invention as defined by the following claims.

What is claimed is:

1. A method for communication, the method comprising:

establishing a mapping scheme between a plurality of control channel element sets and a plurality of acknowledgement channel resource sets, each of the control channel element sets comprising at least one control channel element, each of the acknowledgement channel resource sets comprising at least one acknowledgement channel resource, and at least one of a control channel element set comprising a plurality of control channel elements and an acknowledgment channel resource set comprising a plurality of acknowledgement channel resources;

in accordance with a scheduling grant transmitted using a control channel element set selected from the plurality of control channel element sets, receiving a data packet from a second node at a first node; and transmitting, via the first node, an acknowledgement channel message by using at least one acknowledgement channel resource selected from the acknowledgement channel resource set that corresponds to the control channel element set used for transmitting the scheduling grant in accordance with the mapping scheme, with the acknowledgement channel message being one of a positive acknowledgement message and a negative acknowledgement message.

2. The method of claim 1, the mapping scheme comprising at least one mapping relationship selected from a group of mapping relationships comprising:

an acknowledgement channel resource set comprising one acknowledgement channel resource corresponding to a control channel element set comprising one control channel element;

an acknowledgement channel resource set comprising one acknowledgement channel resource corresponding to a control channel element set comprising more than one control channel element;

an acknowledgement channel resource set comprising more than one acknowledgement channel resource corresponding to a control channel element set comprising one control channel element; and an acknowledgement channel resource set comprising more than one acknowledgement channel resource corresponding to a control channel element set comprising more than one control channel element.

3. The method of claim 1, wherein the plurality of acknowledgement channel resource sets are constructed from one of one or a set of Zadoff-Chu sequences with different indices, one or a set of Zadoff-Chu sequences with different offsets, and one or a set of Zadoff-Chu sequences with different hopping patterns, with the Zadoff-Chu sequence being established by:

$$g_p(n) = \begin{cases} e^{-j\frac{2\pi}{M}\frac{1}{2}pn^2} & \text{when } N \text{ is even} \\ e^{-j\frac{2\pi}{M}\frac{1}{2}pn(n+1)} & \text{when } N \text{ is odd} \end{cases}, n = 0, 1, \ldots, N-1,$$

where N is the length of the Zadoff-Chu sequence, p is the index of the Zadoff-Chu sequence and p is relatively prime to N, and n is the sample index of the Zadoff-Chu sequence.

4. The method of claim 1, the acknowledgement channel resources being distinguished from each other in time domain or in frequency domain.

5. The method of claim 1, the mapping scheme changing along at least one dimension selected from time, frequency, sector, and code and sequence set.

6. The method of claim 5, the mapping scheme changing at different scale along each dimension.

7. The method of claim 1, further comprising simultaneously transmitting more than one acknowledgement channel messages by using more than one acknowledgement channel resource sets.

8. The method of claim 7, the more than one acknowledgement channel resource sets comprising different numbers of acknowledgement channel resources.

9. The method of claim 1, at least two of the control channel element sets overlapping each other.

10. The method of claim 1, at least two of the acknowledgement channel resource sets overlapping each other.

11. A method for communication, the method comprising:

receiving at a first node a plurality of data packets from a second node;

in response to the data packets received, transmitting, from the first node, a plurality of acknowledgement channel messages corresponding to the data packets to the second node using a phase shift keying (PSK) modulation scheme combined with an Off state in an On-Off keying modulation scheme, with each of the plurality of acknowledgement channel messages being one of a positive acknowledgement message and a negative acknowledgement message;

when at least one negative acknowledgement message is transmitted from the first node, re-receiving, from the second node, the data packets corresponding to the at least one negative acknowledgement message; and transmitting, from the first node, acknowledgement channel messages corresponding to the re-received data packets using a different phase shift keying (PSK) modulation scheme with a different keying scheme and a different constellation than the phase shift keying (PSK) modulation scheme used in the transmission of the previous acknowledgement channel messages.

12. The method of claim 11, further comprising, when two data packets are received at the first node, transmitting to the second node two acknowledgement channel messages by using an order-3 phase shift keying (3-PSK) modulation scheme with the Off state.

13. The method of claim 12, further comprising transmitting the two acknowledgement channel messages using the Off state with an absence of carrier wave when both of the two acknowledgement channel messages are negative acknowledgement messages.

14. The method of claim 12, further comprising, when the two acknowledgement channel messages comprise a positive acknowledgement message and a negative acknowledgement message:

re-receiving a data packet from the second node; and in response to re-receiving the data packet, transmitting, from the first node, an acknowledgement channel message to the second node using the On-Off keying modulation scheme.

15. A method for communication, the method comprising:

receiving a data packet at a first node from a second node;

in response to the data packet received, transmitting, from the first node, a plurality of acknowledgement channel messages using a plurality of acknowledgement channel resources, with each of the plurality of the acknowledgement channel messages being one of a positive acknowledgement message (ACK) and a negative acknowledgement message (NAK); and transmitting the plurality of acknowledgement channel messages by using a plurality of distinct acknowledgement channel resources with different states in an On-off keying modulation scheme.

16. The method of claim 15, wherein the plurality of acknowledgement channel resources are constructed from one of a set of Zadoff-Chu sequences with different indices, a set of Zadoff-Chu sequences with different offsets, and a set of Zadoff-Chu sequences with different hopping patterns, with the Zadoff-Chu sequence being established by:

$$g_p(n) = \begin{cases} e^{-j\frac{2\pi}{M}\frac{1}{2}pn^2} & \text{when } N \text{ is even} \\ e^{-j\frac{2\pi}{M}\frac{1}{2}pn(n+1)} & \text{when } N \text{ is odd} \end{cases}, n = 0, 1, \ldots, N-1,$$

where N is the length of the Zadoff-Chu sequence, p is the index of the Zadoff-Chu sequence and p is relatively prime to N, and n is the sample index of the Zadoff-Chu sequence.

17. The method of claim 16, further comprising transmitting two acknowledgement (ACK) channel messages by using four distinct acknowledgement channel resources constructed from four Zadoff-Chu (ZC) sequences having different offsets in accordance with the following table:

| ACK channel resources | ACK channel message 1 | ACK channel message 2 |
|---|---|---|
| ZC sequence with offset $n_1$ | NAK | NAK |
| ZC sequence with offset $n_2$ | NAK | ACK |
| ZC sequence with offset $n_3$ | ACK | NAK |
| ZC sequence with offset $n_4$ | ACK | ACK. |

18. The method of claim 15, further comprising transmitting two acknowledgement (ACK) channel messages by using three distinct acknowledgement channel resources with the On-off keying modulation scheme in accordance with the following table:

| ACK channel resource 1 | ACK channel resource 2 | ACK channel resource 3 | ACK channel message 1 | ACK channel message 2 |
|---|---|---|---|---|
| OFF | OFF | OFF | NAK | NAK |
| ON | OFF | OFF | NAK | ACK |
| OFF | ON | OFF | ACK | NAK |
| OFF | OFF | ON | ACK | ACK. |

19. The method of claim 15, further comprising transmitting two acknowledgement (ACK) channel messages by using two distinct acknowledgement channel resources with the On-off keying modulation scheme in accordance with the following table:

| ACK channel resource 1 | ACK channel resource 2 | ACK channel message 1 | ACK channel message 2 |
|---|---|---|---|
| OFF | OFF | NAK | NAK |
| ON | OFF | NAK | ACK |
| OFF | ON | ACK | NAK |
| ON | ON | ACK | ACK. |

20. A method for communication, the method comprising the steps of:

assigning two resource blocks at opposite edges of a band of transmission resource to acknowledgement channel transmission in a Frequency Division Multiple Access (FDMA) system, with each resource block comprising a certain number of continuous frequency subcarriers;

mapping a plurality of acknowledgement channel messages into each one of the two resource blocks at each one of two time slots in a time-domain subframe, with each time slot comprising a certain number of continuous time blocks;

multiplexing the time blocks mapped with the acknowledgement channel messages in the two time slots; and transmitting the plurality of acknowledgement channel messages by using the corresponding time slots and resource blocks.

21. The method of claim 20, wherein, in each one of the two time slots, the time blocks assigned to at least one of the acknowledgement channel messages are continuous.

22. The method of claim 20, wherein, in each one of the two time slots, the time blocks assigned to at least one of the acknowledgement channel messages are not continuous.

23. The method of claim 20, further comprising modulating each of the acknowledgement channel messages by using a keying scheme selected from a group of On-off keying, Binary Phase Shift Keying, and orthogonal signaling, with each of the plurality of acknowledgement channel messages being one of a positive acknowledgement message and a negative acknowledgement message.

24. A method for communication, the method comprising the steps of:

mapping a plurality of acknowledgement channel messages to a plurality of input ports of a discrete Fourier transform unit, with each acknowledgement message corresponding to at least one input port;

transforming the plurality of acknowledgement channel messages to generate a single signal by using the discrete Fourier transform unit;

processing the generated signal and a data signal in a single carrier frequency division multiple access system; and transmitting the processed signals via an antenna.

25. The method of claim 24, a set of input ports that correspond to at least one acknowledgement channel message being continuous.

26. The method of claim 24, a set of input ports that correspond to at least one acknowledgement channel message being not continuous.

27. A base station in a wireless communication system, with the base station:

storing a mapping scheme between a plurality of control channel element sets and a plurality of acknowledgement channel resource sets, each of the control channel element sets comprising at least one control channel element, each of the acknowledgement channel resource sets comprising at least one acknowledgement channel resource, and at least one of a control channel element set comprising a plurality of control channel elements and an acknowledgment channel resource set comprising a plurality of acknowledgement channel resources;

transmitting a scheduling grant using a control channel element set selected from the plurality of control channel element sets to a unit of user equipment; and in response to a data packet transmitted from the unit of user equipment, transmitting an acknowledgement channel message by using at least one acknowledgement channel resource selected from the acknowledgement channel resource set that correspond to the control channel element set used for transmitting the scheduling grant in accordance with the mapping scheme, with the acknowledgement channel message being one of a positive acknowledgement message and a negative acknowledgement message.

28. A base station in a wireless communication system, with the base station:

receiving a plurality of data packets;

transmitting a plurality of acknowledgement channel messages corresponding to the received data packets using a phase shift keying (PSK) modulation scheme combined with an Off state in an On-Off keying modulation scheme, with each of the plurality of acknowledgement channel messages being one of a positive acknowledgement message and a negative acknowledgement message;

when at least one negative acknowledgement message is transmitted from the first node, re-receiving, from the second node, the data packets corresponding to the at least one negative acknowledgement message; and transmitting, from the first node, acknowledgement channel messages corresponding to the re-received data packets using a different phase shift keying (PSK) modulation scheme with a different keying scheme and a different constellation than the phase shift keying (PSK) modulation scheme used in the transmission of the previous acknowledgement channel messages.

29. A base station in a wireless communication system, with the base station:

assigning two resource blocks at opposite edges of a band of transmission resource for acknowledgement channel transmission in a Frequency Division Multiple Access (FDMA) system, with each resource block comprising a certain number of continuous frequency subcarriers;

mapping a plurality of acknowledgement channel messages into each one of the two resource blocks at each one of two time slots in a time-domain subframe, with each time slot comprising a certain number of continuous time blocks;

multiplexing the time blocks mapped with the acknowledgement channel messages in the two time slots; and transmitting the plurality of acknowledgement channel messages using the corresponding time slots and resource blocks.

30. A base station in a wireless communication system, with the base station:

mapping a plurality of acknowledgement channel messages to a plurality of input ports of a discrete Fourier transform unit, with each acknowledgement message corresponding to at least one input port;

transforming the plurality of acknowledgement channel messages to generate a single signal using the discrete Fourier transform unit;

processing the generated signal and a data signal in a Single carrier frequency division multiple access system; and transmitting the signals via an antenna.

31. A wireless terminal in a wireless communication system, with the wireless terminal:

storing a mapping scheme between a plurality of control channel element sets and a plurality of acknowledgement channel resource sets, each of the control channel element sets comprising at least one control channel element, each of the acknowledgement channel resource sets comprising at least one acknowledgement channel resource, and at least one of a control channel element set comprising a plurality of control channel elements and an acknowledgment channel resource set comprising a plurality of acknowledgement channel resources;

receiving a scheduling grant transmitted from a base station using a control channel element set selected from the plurality of control channel element sets; and in response to a data packet transmitted from the base station, transmitting an acknowledgement channel message by using at least one acknowledgement channel resource selected from the acknowledgement channel resource set that correspond to the control channel element set used for transmitting the scheduling grant in accordance with the mapping scheme, with the acknowledgement channel message being one of a positive acknowledgement message and a negative acknowledgement message.

32. A wireless terminal in a wireless communication system, with the wireless terminal:

receiving a plurality of data packets from a base station;

transmitting a plurality of acknowledgement channel messages to the base station by using a phase shift keying (PSK) modulation scheme combined with an Off state in an On-Off keying modulation scheme, with each of the plurality of acknowledgement channel messages being one of a positive acknowledgement message and a negative acknowledgement message;

when at least one negative acknowledgement message is transmitted from the first node, re-receiving, from the second node, the data packets corresponding to the at least one negative acknowledgement message; and transmitting, from the first node, acknowledgement channel messages corresponding to the re-received data packets using a different phase shift keying (PSK) modulation scheme with a different keying scheme and a different constellation than the phase shift keying (PSK) modulation scheme used in the transmission of the previous acknowledgement channel messages.

33. A wireless terminal in a wireless communication system, with the wireless terminal:

assigning two resource blocks at opposite edges of a band of transmission resource for acknowledgement channel transmission in a Frequency Division Multiple Access (FDMA) system, with each resource block comprising a certain number of continuous frequency subcarriers;

mapping a plurality of acknowledgement channel messages into each one of the two resource blocks at each one of two time slots in a time-domain subframe, with each time slot comprising a certain number of continuous time blocks;

multiplexing the time blocks mapped with the acknowledgement channel messages in the two time slots; and transmitting the plurality of acknowledgement channel messages using the corresponding time slots and resource blocks.

34. A wireless terminal in a wireless communication system, with the wireless terminal:

mapping a plurality of acknowledgement channel messages to a plurality of input ports of a discrete Fourier transform unit, with each acknowledgement message corresponding to at least one input port;

transforming the plurality of acknowledgement channel messages to generate a single signal using the discrete Fourier transform unit;

processing the generated signal and a data signal in a single carrier frequency division multiple access system; and transmitting the signals via an antenna.

* * * * *